United States Patent
Matsuhara et al.

(10) Patent No.: US 8,930,510 B2
(45) Date of Patent: Jan. 6, 2015

(54) IMAGE FORMATION APPARATUS, NETWORK SYSTEM, AND PROGRAM PRODUCT FOR NETWORK OPERATION AT LOW COST

(75) Inventors: Kenji Matsuhara, Kawanishi (JP); Fumiko Uchino, Otokuni-gun (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1331 days.

(21) Appl. No.: 11/353,181

(22) Filed: Feb. 14, 2006

(65) Prior Publication Data
US 2007/0130298 A1    Jun. 7, 2007

(30) Foreign Application Priority Data
Nov. 15, 2005   (JP) ................................ 2005-330288

(51) Int. Cl.
G06F 15/16    (2006.01)
H04N 1/00     (2006.01)
H04N 1/44     (2006.01)

(52) U.S. Cl.
CPC .... *H04N 1/00344* (2013.01); *H04N 2201/0039* (2013.01); *H04N 2201/0094* (2013.01); *H04N 1/4406* (2013.01)
USPC ........... 709/221; 709/209; 709/224; 709/226; 709/237

(58) Field of Classification Search
USPC ........................... 709/221, 209, 224, 237, 226
See application file for complete search history.

(56) References Cited

U.S. PATENT DOCUMENTS

| | | | | |
|---|---|---|---|---|
| 6,049,828 | A * | 4/2000 | Dev et al. | 709/224 |
| 6,256,750 | B1 * | 7/2001 | Takeda | 714/11 |
| 6,324,571 | B1 * | 11/2001 | Hacherl | 709/208 |
| 6,535,491 | B2 * | 3/2003 | Gai et al. | 370/256 |
| 6,618,166 | B1 * | 9/2003 | Suzue | 358/1.15 |
| 6,880,000 | B1 * | 4/2005 | Tominaga et al. | 709/220 |
| 7,035,918 | B1 * | 4/2006 | Redding et al. | 709/223 |
| 7,047,088 | B2 * | 5/2006 | Nakamura et al. | 700/19 |
| 7,127,565 | B2 * | 10/2006 | Kazar | 711/152 |
| 7,251,813 | B2 * | 7/2007 | Kosuge | 717/171 |
| 7,475,108 | B2 * | 1/2009 | Di Giulio et al. | 709/203 |
| 7,480,816 | B1 * | 1/2009 | Mortazavi et al. | 714/4.1 |
| 7,797,756 | B2 * | 9/2010 | Herington | 726/31 |
| 8,321,554 | B2 * | 11/2012 | Dickinson | 709/224 |

(Continued)

FOREIGN PATENT DOCUMENTS

JP    10-240470    9/1998
JP    11-272534    10/1999

(Continued)

OTHER PUBLICATIONS

Decision to Grant Patent in JP 2005-330288 dated Apr. 14, 2009, and an English Translation thereof.

*Primary Examiner* — Andrew Georgandellis
*Assistant Examiner* — Anthony Fabbri
(74) *Attorney, Agent, or Firm* — Buchanan Ingersoll & Rooney PC

(57) ABSTRACT

A supervision feasible apparatus capable of operating in a supervisory mode directed to supervising supervision information related to a plurality of apparatuses detects, when set at a supervisory mode, an apparatus attaining a data access enable state and an apparatus attaining a data access disable state with respect to a network, and updates supervisory information based on information related to the detected apparatus.

18 Claims, 25 Drawing Sheets

(56) References Cited

U.S. PATENT DOCUMENTS

| | | | |
|---|---|---|---|
| 2002/0073228 A1* | 6/2002 | Cognet et al. | 709/236 |
| 2002/0107934 A1* | 8/2002 | Lowery et al. | 709/213 |
| 2002/0161740 A1* | 10/2002 | Nakamura et al. | 707/1 |
| 2003/0072448 A1 | 4/2003 | Nakamura et al. | |
| 2004/0024861 A1* | 2/2004 | Coughlin | 709/224 |
| 2005/0005200 A1* | 1/2005 | Matena et al. | 714/38 |
| 2005/0018241 A1* | 1/2005 | Azami | 358/1.15 |
| 2006/0126201 A1* | 6/2006 | Jain | 360/15 |
| 2006/0159090 A1* | 7/2006 | Chang et al. | 370/390 |
| 2006/0224686 A1* | 10/2006 | Kitada | 709/209 |
| 2007/0130264 A1* | 6/2007 | Walker | 709/206 |
| 2009/0100133 A1* | 4/2009 | Giulio et al. | 709/203 |

FOREIGN PATENT DOCUMENTS

| | | |
|---|---|---|
| JP | 2000-151892 | 5/2000 |
| JP | 2000-238384 | 9/2000 |
| JP | 2003-091427 | 3/2003 |
| JP | 2003-122537 | 4/2003 |
| JP | 2003-162305 | 6/2003 |
| JP | 2004-291629 | 10/2004 |
| JP | 2005-004251 | 1/2005 |

* cited by examiner

FIG. 3A  LICENSE TABLE  T100

| CLASS 1 | CLASS 2 | CLASS 3 | NO. OF LICENSES |
|---|---|---|---|
| FAX | FUNCTION A | FUNCTION 1 | 1 |
| COPY | FUNCTION B | FUNCTION 2 | 1 |
| | FUNCTION C | FUNCTION 3 | 1 |
| | FUNCTION D | FUNCTION 4 | 0 |
| PRINTER | FUNCTION E | FUNCTION 5 | 1 |
| SCANNER | FUNCTION F | FUNCTION 6 | 1 |
| | FUNCTION G | FUNCTION 7 | 0 |

FIG. 3B  LICENSE SUPERVISORY TABLE  T200

| CLASS 1 | CLASS 2 | CLASS 3 | NO. OF LICENSES |
|---|---|---|---|
| FAX | FUNCTION A | FUNCTION 1 | 1 |
| COPY | FUNCTION B | FUNCTION 2 | 1 |
| | FUNCTION C | FUNCTION 3 | 1 |
| | FUNCTION D | FUNCTION 4 | 0 |
| PRINTER | FUNCTION E | FUNCTION 5 | 1 |
| SCANNER | FUNCTION F | FUNCTION 6 | 1 |
| | FUNCTION G | FUNCTION 7 | 0 |

FIG. 3C  LICENSE TABLE  T110

| CLASS 1 | CLASS 2 | CLASS 3 | NO. OF LICENSES |
|---|---|---|---|
| FAX | FUNCTION A | FUNCTION 1 | 0 |
| COPY | FUNCTION B | FUNCTION 2 | 1 |
| | FUNCTION C | FUNCTION 3 | 0 |
| | FUNCTION D | FUNCTION 4 | 0 |
| PRINTER | FUNCTION E | FUNCTION 5 | 1 |
| SCANNER | FUNCTION F | FUNCTION 6 | 1 |
| | FUNCTION G | FUNCTION 7 | 0 |

FIG. 3D  LICENSE SUPERVISORY TABLE  T200A

| CLASS 1 | CLASS 2 | CLASS 3 | NO. OF LICENSES | |
|---|---|---|---|---|
| FAX | FUNCTION A | FUNCTION 1 | 1 | |
| COPY | FUNCTION B | FUNCTION 2 | 2 | +1 |
| | FUNCTION C | FUNCTION 3 | 1 | |
| | FUNCTION D | FUNCTION 4 | 0 | |
| PRINTER | FUNCTION E | FUNCTION 5 | 2 | +1 |
| SCANNER | FUNCTION F | FUNCTION 6 | 2 | +1 |
| | FUNCTION G | FUNCTION 7 | 0 | |

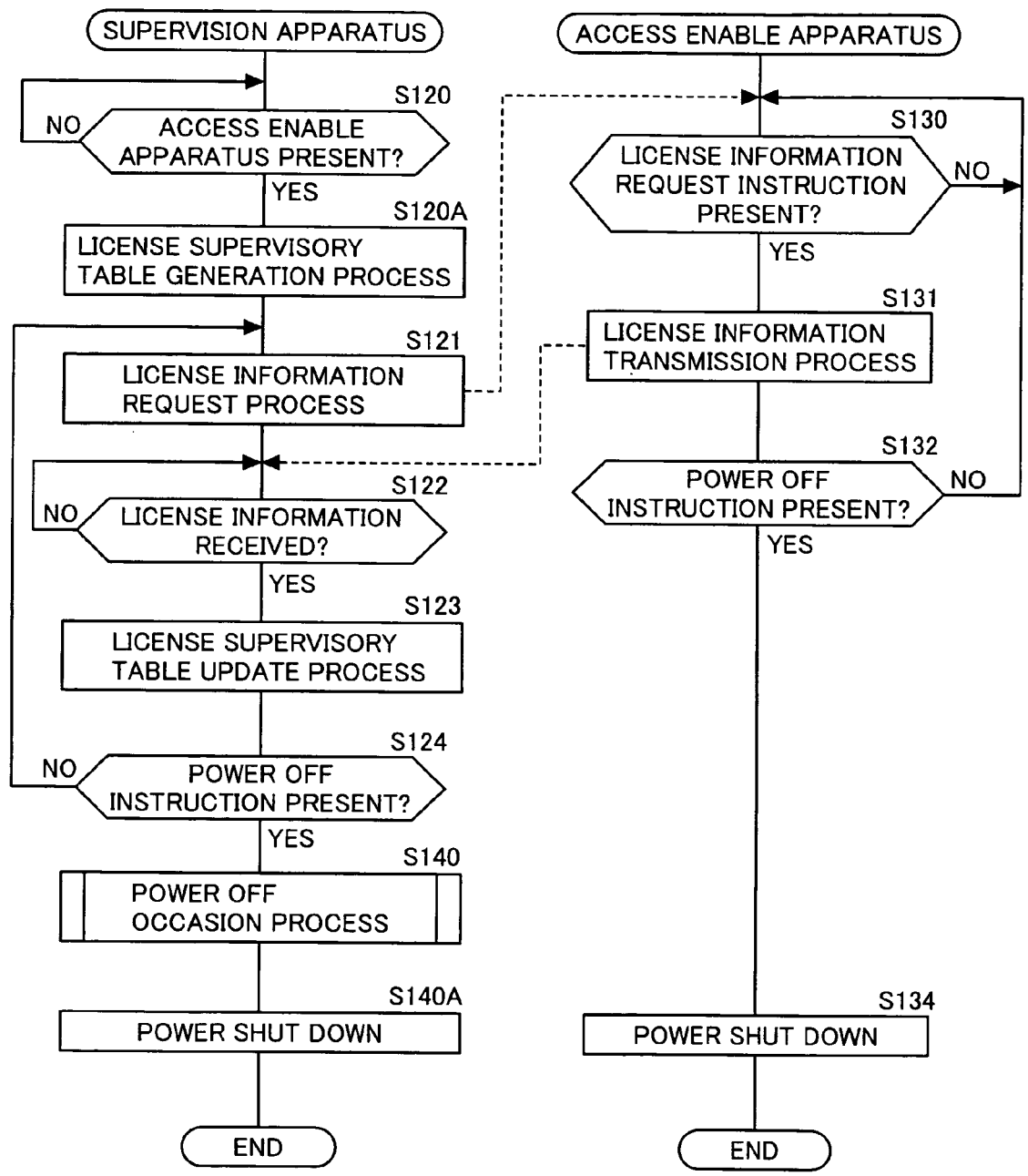

FIG.6A  LICENSE SUPERVISORY TABLE  T210

| CLASS 1 | CLASS 2 | CLASS 3 | NO. OF LICENSES |
|---|---|---|---|
| FAX | FUNCTION A | FUNCTION 1 | 8 |
| COPY | FUNCTION B | FUNCTION 2 | 6 |
|  | FUNCTION C | FUNCTION 3 | 5 |
|  | FUNCTION D | FUNCTION 4 | 9 |
| PRINTER | FUNCTION E | FUNCTION 5 | 7 |
| SCANNER | FUNCTION F | FUNCTION 6 | 10 |
|  | FUNCTION G | FUNCTION 7 | 9 |

FIG.6B  LICENSE TABLE  T150

| CLASS 1 | CLASS 2 | CLASS 3 | NO. OF LICENSES |
|---|---|---|---|
| FAX | FUNCTION A | FUNCTION 1 | 1 |
| COPY | FUNCTION B | FUNCTION 2 | 1 |
|  | FUNCTION C | FUNCTION 3 | 1 |
|  | FUNCTION D | FUNCTION 4 | 0 |
| PRINTER | FUNCTION E | FUNCTION 5 | 1 |
| SCANNER | FUNCTION F | FUNCTION 6 | 1 |
|  | FUNCTION G | FUNCTION 7 | 2 |

FIG.6C  LICENSE SUPERVISORY TABLE  T210A

| CLASS 1 | CLASS 2 | CLASS 3 | NO. OF LICENSES |  |
|---|---|---|---|---|
| FAX | FUNCTION A | FUNCTION 1 | 7 | −1 |
| COPY | FUNCTION B | FUNCTION 2 | 5 | −1 |
|  | FUNCTION C | FUNCTION 3 | 4 | −1 |
|  | FUNCTION D | FUNCTION 4 | 9 |  |
| PRINTER | FUNCTION E | FUNCTION 5 | 6 | −1 |
| SCANNER | FUNCTION F | FUNCTION 6 | 9 | −1 |
|  | FUNCTION G | FUNCTION 7 | 7 | −2 |

FIG.7A  LICENSE TABLE  T120

| CLASS 1 | CLASS 2 | CLASS 3 | NO. OF LICENSES |
|---|---|---|---|
| FAX | FUNCTION A | FUNCTION 1 | 1 |
| COPY | FUNCTION B | FUNCTION 2 | 0 |
|  | FUNCTION C | FUNCTION 3 | 0 |
|  | FUNCTION D | FUNCTION 4 | 1 |
| PRINTER | FUNCTION E | FUNCTION 5 | 1 |
| SCANNER | FUNCTION F | FUNCTION 6 | 1 |
|  | FUNCTION G | FUNCTION 7 | 2 |

FIG.7B  LICENSE SUPERVISORY TABLE  T200B

| CLASS 1 | CLASS 2 | CLASS 3 | NO. OF LICENSES | |
|---|---|---|---|---|
| FAX | FUNCTION A | FUNCTION 1 | 2 | +1 |
| COPY | FUNCTION B | FUNCTION 2 | 2 | |
|  | FUNCTION C | FUNCTION 3 | 1 | |
|  | FUNCTION D | FUNCTION 4 | 1 | +1 |
| PRINTER | FUNCTION E | FUNCTION 5 | 3 | +1 |
| SCANNER | FUNCTION F | FUNCTION 6 | 3 | +1 |
|  | FUNCTION G | FUNCTION 7 | 2 | +2 |

ACCOUNT SUPERVISORY TABLE                                    T300

| IPアドレス | USER NAME | PASSWORD | NO. OF PRINTS |
|---|---|---|---|
|  | SASAKI | ABC | 10 |
| 150.16.119.104 | SATOU | BBB | 9876 |
|  | SUZUKI | CCC | 160 |
|  | NAKAMURA | XYZ | 7 |
|  | SASAKI | ABC | 546 |
| 150.16.119.105 | SATOU | BBB | 329 |
|  | SUZUKI | CCC | 86 |
| ⋮ | ⋮ | ⋮ | ⋮ |

IMAGE FORMATION APPARATUS, NETWORK SYSTEM, AND PROGRAM PRODUCT FOR NETWORK OPERATION AT LOW COST

This application is based on Japanese Patent Application No. 2005-330288 filed with the Japan Patent Office on Nov. 15, 2005, the entire content of which is hereby incorporated by reference.

BACKGROUND OF THE INVENTION

1. Field of the Invention

The present invention relates to an image processing apparatus, a network system, and a program product. Particularly, the present invention relates to an image information apparatus supervising information of a plurality of apparatuses, a network system, and a program product.

2. Description of the Related Art

In a system in which a plurality of MFPs (Multi Function Peripherals), a plurality of terminals and a server for supervising the same are connected on a network, the server supervises various items related to the MFP.

The items supervised by the server include a variety such as license management, account management, address management, management of access right, and the like. As used herein, MFP includes an apparatus having a plurality of functions such as a printer, facsimile, scanner, and the like.

Japanese Laid-Open Patent Publication No. 2003-122537 discloses art related to license management. In this system, a server stores the number of licenses set for each operational function of the MFP. When the user requests a predetermined operational function, the server determines whether the currently-used number of the corresponding operational function has reached the relevant number of licenses to allow or disallow usage of the requested operational function.

The aforementioned publication also discloses that license management, which is generally carried out by the server, may be carried out by an MFP that has the function of license management.

When a PC (Personal Computer) is to undertake the server supervisory function for supervision of various items under an environment in which a plurality of MFPs and terminals are connected on a network, a PC dedicated as the server must be prepared in addition to the MFP, leading to increase in cost for the entire system.

For large power consumption reasons, the MFP is generally turned on during working hours or when that MPF is to be used, and turned off at the end of the day or when not in use. In the case where one of the plurality of MFPs carries out the server supervisory function under such circumstances, it will be expected that the power of the relevant MFP may not be always ON. For example, when the power of a general MFP is turned on before the power of the MFP with the server management function is turned on, network operation is disabled due to the absence of the server.

There is also the possibility of the power of the MFP with the server supervisory function being turned off before the power of all the other MFPs connected on the network is turned off. Usage of data under supervision for the other MFPs will be disallowed when the power of the MFP with the server supervisory function is turned off. This will lead to deficiency in running the network since the operation of other MFPs connected on the network will be disturbed or disabled.

SUMMARY OF THE INVENTION

In view of the foregoing, an object of the present invention is to provide an image formation apparatus, a network system, and a program product that develops autonomously a network that includes a MFP having a server supervisory function of supervising a plurality of items in the process of a plurality of MFPs being turned on and connected on the network.

Another object of the present invention is to provide an image formation apparatus, a network system, and a program product capable of autonomous network operation, dispensible of a dedicated apparatus with a server supervisory function by shifting the server supervisory function of an MFP that is to be turned off to another MFP during the process of a plurality of MFPs being turned off to be disconnected from the network.

According to an aspect of the present invention, in a network that allows a plurality of apparatuses to be connected, an image formation apparatus is connected to the network and capable of operating in a supervisory mode directed to supervising supervision information related to the plurality of apparatuses. When one or more apparatuses among the plurality of apparatuses is an apparatus with a function of image formation, and at least one apparatus among the one or more apparatuses functions as a supervision feasible apparatus capable of operating in a supervisory mode, the image formation apparatus includes a supervisory mode setting unit to set the supervisory mode, an information update unit to update supervisory information, and a detection unit to detect an apparatus attaining a data access enable state and an apparatus attaining a data access disable state with respect to the network. The information update unit updates supervisory information based on information related to the apparatus detected by the detection unit when the image formation apparatus is set at the supervisory mode.

Preferably, the image formation apparatus further includes a supervision feasible apparatus detection unit to detect a supervision feasible apparatus. When a supervision feasible apparatus in a data access enable state with respect to the network is not detected by the supervision feasible apparatus detection unit at the point of time of attaining a data access enable state with respect to the network, the supervisory mode setting unit sets the image formation apparatus at the supervisory mode.

Preferably, the image formation apparatus further includes a supervision feasible apparatus detection unit to detect a supervision feasible apparatus, and a supervisory information reception unit to receive supervisory information. At the time of point of attaining a data access enable state with respect to the network, the supervisory information reception unit receives supervisory information from a supervision feasible apparatus set at the supervisory mode among one or more supervision feasible apparatuses detected by the supervision feasible apparatus detection unit, and the supervisory mode setting unit sets the image formation apparatus at a supervisory mode.

Preferably, the image formation apparatus further includes a supervision feasible apparatus detection unit to detect a supervision feasible apparatus, and a supervisory information transmission unit to transmit supervisory information. The supervisory information transmission unit transmits supervisory information to one or more supervision feasible apparatuses in a data access enable state with respect to the network, detected by the supervision feasible apparatus detection unit, when the image formation apparatus is set at a supervisory mode.

Preferably, the supervisory information transmission unit transmits supervisory information to one or more supervision feasible apparatuses at a predetermined time interval.

Preferably, the image formation apparatus further includes a supervisory information transmission unit to transmit supervisory information. When the image formation apparatus is set at a supervisory mode, the supervisory information transmission unit transmits the supervisory information to one of the one or more supervision feasible apparatuses before attaining a data access disable state with respect to the network.

Preferably, the image formation apparatus further includes a storage unit for storing supervisory information. The storage unit stores the supervisory information before the image formation apparatus attains a data access disable state with respect to the network.

Preferably, the supervisory information includes at least one of license supervisory information, account information, address information, and access right information.

According to another aspect of the present invention, a network system includes a plurality of image formation apparatuses connected to a network on which a plurality of apparatuses are connected. A first information formation apparatus that is one of the plurality of image formation apparatuses is capable of operating in a supervisory mode directed to supervising supervisory information related to a plurality of apparatuses. The first image formation apparatus includes a first supervisory mode setting unit to set the first image formation apparatus at a supervisory mode, and a supervisory information transmission unit to transmit supervisory information. A second image formation apparatus that is one of the plurality of image formation apparatuses is capable of operating in a supervisory mode directed to supervising supervisory information related to a plurality of apparatuses. The second image formation apparatus includes a second supervisory mode setting unit to set the second image formation apparatus at a supervisory mode, a supervisory information reception unit to receive supervisory information, and a supervisory information update unit to update supervisory information. When the supervisory information transmitted by the supervisory information transmission unit of the first image formation apparatus is received by the supervisory information reception unit of the second image formation apparatus, the second supervisory mode setting unit sets the second image formation apparatus at the supervisory mode, and the supervisory information update unit of the second image formation apparatus updates the supervisory information under supervision of the second image formation apparatus based on the received supervisory information.

According to a further aspect of the present invention, in a network that allows a plurality of apparatuses to be connected, a program product to cause an image formation apparatus connected to the network and capable of operating in a supervisory mode directed to supervising supervision information related to the plurality of apparatuses to execute, when one or more apparatuses among the plurality of apparatuses is an apparatus with a function of image formation, and at least one apparatus among the one or more apparatuses functions as a supervision feasible apparatus capable of operating in a supervisory mode, the steps of setting the image formation apparatus at a supervisory mode, detecting an apparatus attaining a data access enable state and an apparatus attaining a data access disable state with respect to the network, and updating supervisory information, when the image formation apparatus is set at the supervisory mode, based on information related to the apparatus detected by the detecting step.

Preferably, the steps of detecting a supervision feasible apparatus, and setting the image formation apparatus at a supervisory mode at a point of time of attaining a data access enable state with respect to the network, when a supervision feasible apparatus in a data access enable state with respect to the network is not detected by the step of detecting a supervision feasible apparatus are further executed by the image formation apparatus.

Preferably, the steps of detecting a supervision feasible apparatus, receiving supervisory information from a supervision feasible apparatus set at a supervisory mode among one or more supervision feasible apparatuses detected by the step of detecting a supervision feasible apparatus, when attaining a data access enable state with respect to the network, and setting the image formation apparatus at a supervisory mode are further executed by the image formation apparatus.

Preferably, the steps of detecting a supervision feasible apparatus, and transmitting supervisory information to one or more supervision feasible apparatuses in a data access enable state with respect to the network, detected by the step of detecting a supervision feasible apparatus, when the image formation apparatus is set at a supervisory mode, are further executed by the image formation apparatus.

Preferably, the step of transmitting includes the step of transmitting supervisory information to one or more supervision feasible apparatuses at a predetermined time interval.

Preferably, the step of transmitting supervisory information to one of the one or more supervision feasible apparatuses before the image formation apparatus attains a data access disable state with respect to the network, when the image formation apparatus is set at the supervisory mode, is further executed by the image formation apparatus.

Preferably, the step of storing supervisory information in a storage unit of the image formation apparatus before the image formation apparatus attains a data access disable state with respect to the network, is further executed by the image formation apparatus.

Preferably, the supervisory information includes at least one of license supervisory information, account information, address information, and access right information.

The image formation apparatus of the present invention develops autonomously an MFP that includes a server supervisory function for supervising various items. Therefore, a network operation supervising the information of a plurality of apparatuses connected on the network is effected, dispensible of a dedicated apparatus for conducting server supervisory function with the power constantly on for supervising supervisory information. This provides the advantage of effecting network operation at low cost.

The network system according to the present invention develops autonomously an MFP that includes a server supervisory function for supervising various items. Therefore, a network operation supervising the information of a plurality of apparatuses connected on the network is effected, dispensible of a dedicated apparatus for conducting server supervisory function with the power constantly on for supervising supervisory information. This provides the advantage of effecting network operation at low cost.

The program product according to the present invention develops autonomously an MFP that includes a server supervisory function for supervising various items. Therefore, a network operation supervising the information of a plurality of apparatuses connected on the network is effected, dispensible of a dedicated apparatus for conducting server supervisory function with the power constantly on for supervising supervisory information. This provides the advantage of effecting network operation at low cost.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3A, 3B, 3C, and 3D represent examples of license tables and license supervisory tables.

FIG. 5 is a flow chart of a supervisory process A.

FIGS. 6A, 6B and 6C represent license supervisory tables updated when the power of an access enable apparatus is OFF.

FIGS. 7A and 7B represent examples of license tables and license supervisory tables.

FIG. 20 represents transfer of supervisory information when MFPs connected on a network are sequentially turned on.

DESCRIPTION OF THE PREFERRED EMBODIMENTS

Figure 1:
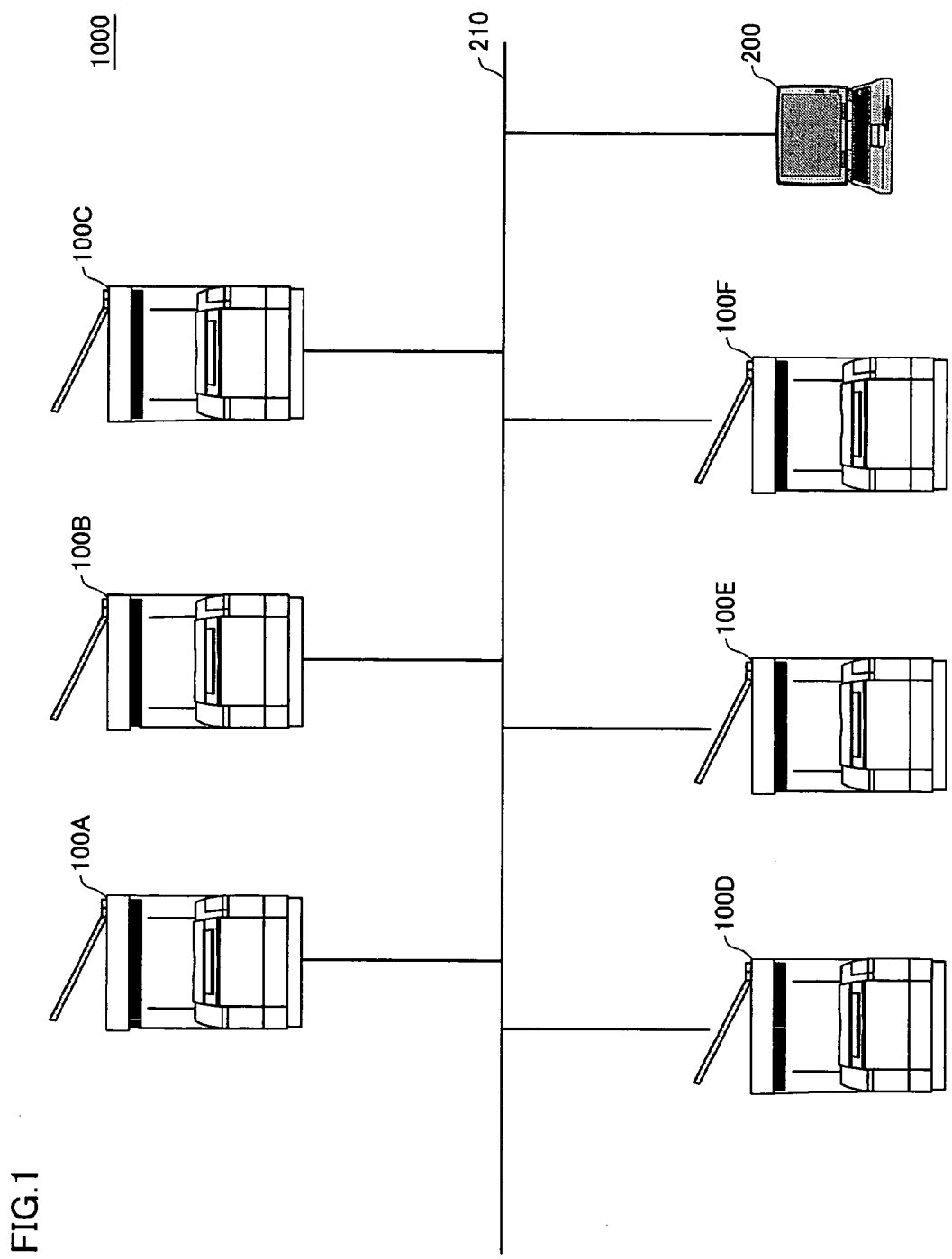
FIG. 1 is a block diagram of a configuration of a network system according to an embodiment of the present invention.

Embodiments of the present invention will be described hereinafter with reference to the drawings. The same or corresponding elements have the same reference characters allotted. Their designation and function are also identical. Therefore, detailed description thereof will not be repeated.

First Embodiment

Referring to FIG. 1, a network system 1000 includes MFPs 100A, 100B, 100C, 100D, 100E, and 100F, a PC 200, and a network 210.

Network 210 is, for example, a LAN.

Each of MFPs 100A, 100B, 100C, 100D, 100E, and 100F is connected on network 210. In the following description, MFPs 100A, 100B, 100C, 100D, 100E, and 100F are also generically referred to as MFP 100. MFP 100 includes a plurality of functions such as facsimile, copy, printer, scanner, and the like. In other words, MFP 100 operates as an image formation apparatus. PC 200 is connected to network 210.

Figure 2:
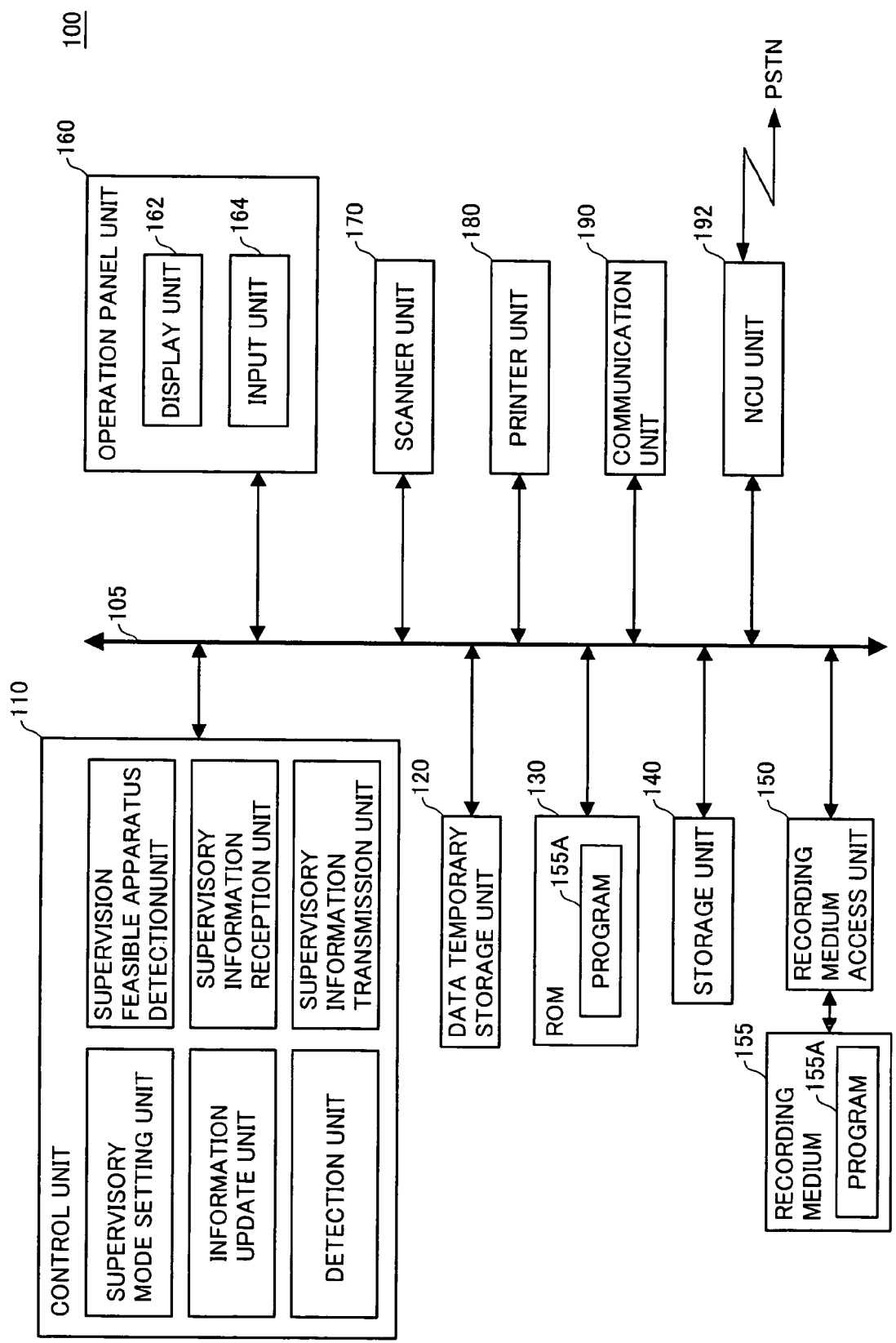
FIG. 2 is a block diagram of an internal configuration of an MFP.

In the block diagram of FIG. 2 corresponding to MFP 100, a recording medium 155 is illustrated by way of example. A program 155A that will be described afterwards is recorded in recording medium 155. Program 155A is distributed as a program product recorded in a medium or the like.

Referring to FIG. 2, MFP 100 includes a data bus 105, a control unit 110, a data temporary storage unit 120, a ROM (Read Only Memory 130, a storage unit 140, and a recording medium access unit 150.

Control unit 110, data temporary storage unit 120, ROM 130, storage unit 140, and recording medium access unit 150 are connected to data bus 105.

In ROM 130 are stored program 155A for control unit 110 to carry out processes that will be described afterwards, other various programs, data, and the like.

Data temporary storage unit 120 is accessed for data by control unit 110, and is employed as a working memory for temporary storage of data. Data temporary storage unit 120 may be a RAM (Random Access Memory) that can temporarily store data, a SRAM (Static Random Access Memory), a DRAM (Dynamic Random Access Memory), a SDRAM (Synchronous DRAM), a DDR-SDRAM (Double Data Rate SDRAM) identified as a SDRAM with a high-speed data transfer function that is called a Double Data Rate mode, a RDRAM (Rambus Dynamic Random Access Memory) identified as a DRAM employing the high-speed interface technique developed by Rambus Corporation, a Direct-RDRAM (Direct Rambus Dynamic Random Access Memory), or otherwise a circuit of a configuration that allows data to be stored in a volatile manner.

Storage unit 140 is a hard disk that can store a large amount of data. Storage unit 140 is not restricted to a hard disk, and may be a circuit of a configuration that can store data in a non-volatile manner even when power is not supplied (for example, a flash memory).

Control unit 110 functions to carry out various processing and/or operation on each elements in MFP 100 in accordance with program 155A stored in ROM 130 or storage unit 140. Control unit 110 operates as a supervisory mode setting unit, an information update unit, a detection unit, a supervision feasible apparatus detection unit, a supervisory information reception unit, and a supervisory information transmission unit.

Control unit 110 may be a microprocessor, a FPGA (Field Programmable Gate Array) based on an LSI (Large Scale Integration) capable of programming, an ASIC (Application Specific Integrated Circuit) that is an integrated circuit designed and produced for a particular application, or a circuit having other operational functions.

Recording medium access unit 150 functions to read out program 155A from recording medium 155. Program 155A in recording medium 155 is read out by recording medium access unit 150 based on an operation of control unit 110 (install process) to be stored in storage unit 140.

This install process program is prestored in storage unit 140. The install process is carried out by control unit 110 based on an install process program.

Program 155A does not have to be stored in ROM 130, nor installed in storage unit 140. In this case, program 155A in recording medium 155 is read out by control unit 110 via recording medium access unit 150, whereby a predetermined process based on program 155A is carried out.

Recording medium 155 may be a DVD-ROM (Digital Versatile Disk Read Only Memory), a CD-ROM (Compact Disk Read Only Memory), an MO (Magneto Optical Disk), a floppy disk, a CF (Compact Flash) card, an SM (Smart Media®:), an MMC (Multi Media Card), an SD (Secure Digital) Memory Card, a Memory Stick®, an xD picture card and USB memory, a magnetic tape, or otherwise a non-volatile memory.

MFP 100 further includes an operation panel unit 160. Operation panel unit 160 is connected to data bus 105.

Operation panel unit 160 includes a display unit 162, and an input unit 164.

Display unit 162 functions to display various information in text, image, and the like to the user. Display unit 162 includes a touch panel function allowing information to be input by direct contact on the screen by the user. Display unit 162 may be a liquid crystal display (LCD), an FED (Field Emission Display), an organic EL (Electro Luminance) display, a display device of another image display system such as (Electro Luminance) display, a display device of another image display system such as the dot matrix, or the like.

Display unit 162 may have a button image that will be described afterwards arranged on the display screen. The user depresses a button image, whereby information corresponding to the depressed button image (hereinafter, also referred to as depressed operation button information) is transmitted to control unit 110.

Input unit 164 is an interface for the user to operate MFP 100. Input unit 164 includes, for example, a plurality of buttons. A power button to turn on or off the power of MFP 100 is included in the plurality of buttons. When the user depresses the power button when MFP 100 is ON, operation panel unit 160 transmits to control unit 110 a power off instruction to turn off the power.

MFP 100 further includes a scanner unit 170, a printer unit 180, a communication unit 190, and an NCU unit (Network Control Unit) 192. Scanner unit 170, printer unit 180, communication unit 190, and NCU unit 192 are connected on data bus 105.

Scanner unit 170 functions to read out an image from a medium such as a sheet of paper.

Printer unit 180 functions to print out a designated image or text on a medium such as a sheet of paper.

Communication unit 190 transfers data to/from network 210, and is a communication interface employing the Ethernet[®]. Communication unit 190 may be a communication interface such as USB (Universal Serial Bus) 1.1, USB 2.0, or another type of serial transfer. Further, communication unit 190 may be a communication interface for data communication utilizing IEEE802.11a, IEEE80211.b, IEEE802.11g that is the standard for wireless LAN, or other wireless techniques.

NCU unit 192 includes the function of facsimile transmission/reception utilizing a public switched telephone network (PSTN).

A license table setting in correspondence the number of licenses set for each function of facsimile, copy, printer, scanner and the like, incorporated in MFP 100, is stored in storage unit 140. As used hereinafter, a license is the right to use the software installed in the MFP, and the right to use the function such as a facsimile, copy, printer, scanner, and the like.

FIG. 3A represents a license table T100. The "function" in the column of "Class 2" in license table T100 is a function corresponding to each of a facsimile, copy, printer and scanner. For example, function F is a function utilizing a scanner. Further, function F is the function to organize data read out by scanner unit 170 in, for example, a file.

The "function" in the column of "Class 3" in license table T100 represents a sub classification of the function in "Class 2" of the corresponding row. For example, function 6 is the function to generate a file in TIFF format when function F is the function to produce data in a file.

The column "license" in license table T100 indicates whether MFP 100 has the license of the function in the corresponding row. 0 indicates that the corresponding function is absent. 1 represents that one of the corresponding functions is included.

The process of the image formation apparatus supervising the information (for example, license information) of a plurality of apparatuses connected on network 210 of in accordance with the present embodiment will be described hereinafter. It is to be understood that the plurality of apparatuses is not limited to MFPs. For example, the plurality of apparatuses include a PC, a facsimile, and the like. In the following, an image formation apparatus supervising the information of a plurality of apparatuses connected on network 210 is also referred to as a supervision apparatus. The supervision apparatus is also referred to as an apparatus set at a supervisory mode.

In the present embodiment, an image formation apparatus first turned on and attaining a data access enable state with respect to network 210, among a plurality of image formation apparatuses that can be set at a supervisory mode connected on network 210, becomes the supervision apparatus. In the following, an image formation apparatus that can be set at a supervisory mode, i.e. an image formation apparatus capable of operating in a supervisory mode, is also referred to as a supervision feasible apparatus. An image formation apparatus that can be set at a supervisory mode, and attaining a data access enable state with respect to network 210 is also referred to as an access enable apparatus.

The present embodiment is based on an MFP as an example of an image formation apparatus. It is assumed that MFP 100A is the first powered-on apparatus in network system 1000. In this case, MFP 100A executes the process of supervising the license of each apparatus in network system 1000.

Figure 4:
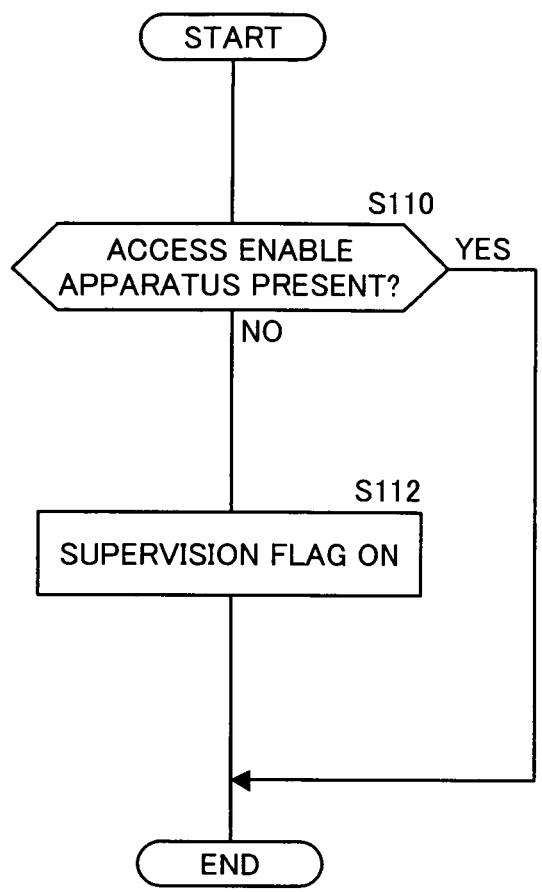
FIG. 4 is a flow chart of a process carried out by a MFP.

Referring to the flow chart of FIG. 4, control unit 110 determines whether there is an access enable apparatus among a plurality of apparatuses connected on network 210 at step S110. When YES at step S110, the process ends, otherwise (NO at step S110), control proceeds to step S112.

At step S112, control unit 110 turns on the supervision flag provided in data temporary storage unit 120. The supervision flag is initially set at an OFF state. The apparatus with a supervision flag turned ON supervises the information (for example, license information) of the plurality of apparatuses connected on network 210. In the following, the apparatus with a supervision flag turned ON is also referred to as the apparatus set at a supervisory mode. In other words, MFP 100A becomes the apparatus set at a supervisory mode. Then, the present process ends.

The process of the supervision apparatus according to the present embodiment will be described hereinafter. The process carried out by the supervision apparatus in the present embodiment is referred to as a supervisory process A.

Referring to the flow chart of FIG. 5, the process of step S120 is carried out at the supervision apparatus.

At step S120, control unit 110 determines whether there is an access enable apparatus among the plurality of apparatuses connected on network 210. When YES at step S120, control proceeds to step S120A, otherwise (NO at step S120), the process of step S120 is repeated.

At step S120A, a license supervisory table generation process is carried out. In this process, control unit 110 generates a license supervisory table based on a license table stored in storage unit 140. It is assumed that the license table corresponds to license table T100 of FIG. 3A. It is assumed that the generated license supervisory table corresponds to license supervisory table T200 of FIG. 3B. Control unit 110 stores the generated license supervisory table T200 in storage unit 140. Then, control proceeds to step S121.

At step S121, a license information request process is conducted. In this process, control unit 110 transmits to all the access enable apparatuses an instruction to request license information of each of all the access enable apparatuses (hereinafter, also referred to as license information request instruction).

At an access enable apparatus, the process of step S130 is first carried out. At step S130, control unit 110 determines whether a license information request instruction is received from the supervision apparatus. When YES at step S130, control proceeds to step S131 otherwise (NO at step S131), the process of step S130 is repeated.

At step S131, a license information transmission process is carried out. In this process, license information based on the license table stored in storage unit 140 is transmitted to the supervision apparatus. Here, it is assumed that the license table corresponds to license table T 110 of FIG. 3C.

At the supervision apparatus, control proceeds to step S122, following the process of step S121.

At step S122, control unit 110 determines whether license information has been received from the supervision apparatus. When YES at step S122, control proceeds to step S123, otherwise (NO at step S122), the process of step S122 is carried out again.

At step S123, a license supervisory table update process is carried out. In this process, control unit 110 updates license supervisory table T200 stored in storage unit 140 based on the received license information. Since the license number of function 2, function 5 and function 6 is 1 in the received license information, the updated license supervisory table now corresponds to license supervisory table T200A of FIG. 3D. When corresponding license information is received from each of the plurality of access enable apparatuses, control unit 110 updates the license supervisory table based on the plurality of received license information.

Control unit 110 constantly monitors network 210 such that the license supervisory table is updated, when the power of the access enable apparatus that has transmitted the license information is turned off, by subtracting from the number of licenses of the function incorporated in the corresponding access enable apparatus.

FIG. 6A represents a license supervisory table T210, by way of example, prior to update at step S123.

FIG. 6B represents a license table T150 corresponding to an access enable apparatus that is turned off.

At this stage, control unit 110 updates license supervisory table T210 based on license table T150. The updated license supervisory table corresponds to license supervisory table T210A of FIG. 6C.

Then, control proceeds to step S124.

At step S124, determination is made whether a power off instruction is provided or not. Specifically, control unit 110 determines whether a power off instruction has been received or not in response to a user's depression operation of the power button. When YES at step S124, control proceeds to step S140, otherwise (NO at step S124), the process of step S121 is carried out again.

Thus, the process of steps S121, S122, and S123 is repeated until the condition of step S124 is met. In other words, the license supervisory table is updated in accordance with the increase/decrease of access enable apparatuses on network 210.

For example, it is now assumed that license information based on license table T120 that will be described afterwards is received by the supervision apparatus from an access enable apparatus differing from the access enable apparatus set forth above, prior to the process of step S122.

FIG. 7A represents license table T120.

Referring again to FIG. 5, the license supervisory table update process set forth above is carried out at step S123.

License supervisory table T200A is updated based on the received license information. The updated license supervisory table corresponds to license supervisory table T200B of FIG. 7B.

At step S140, a power off occasion process is carried out.

Figure 8:
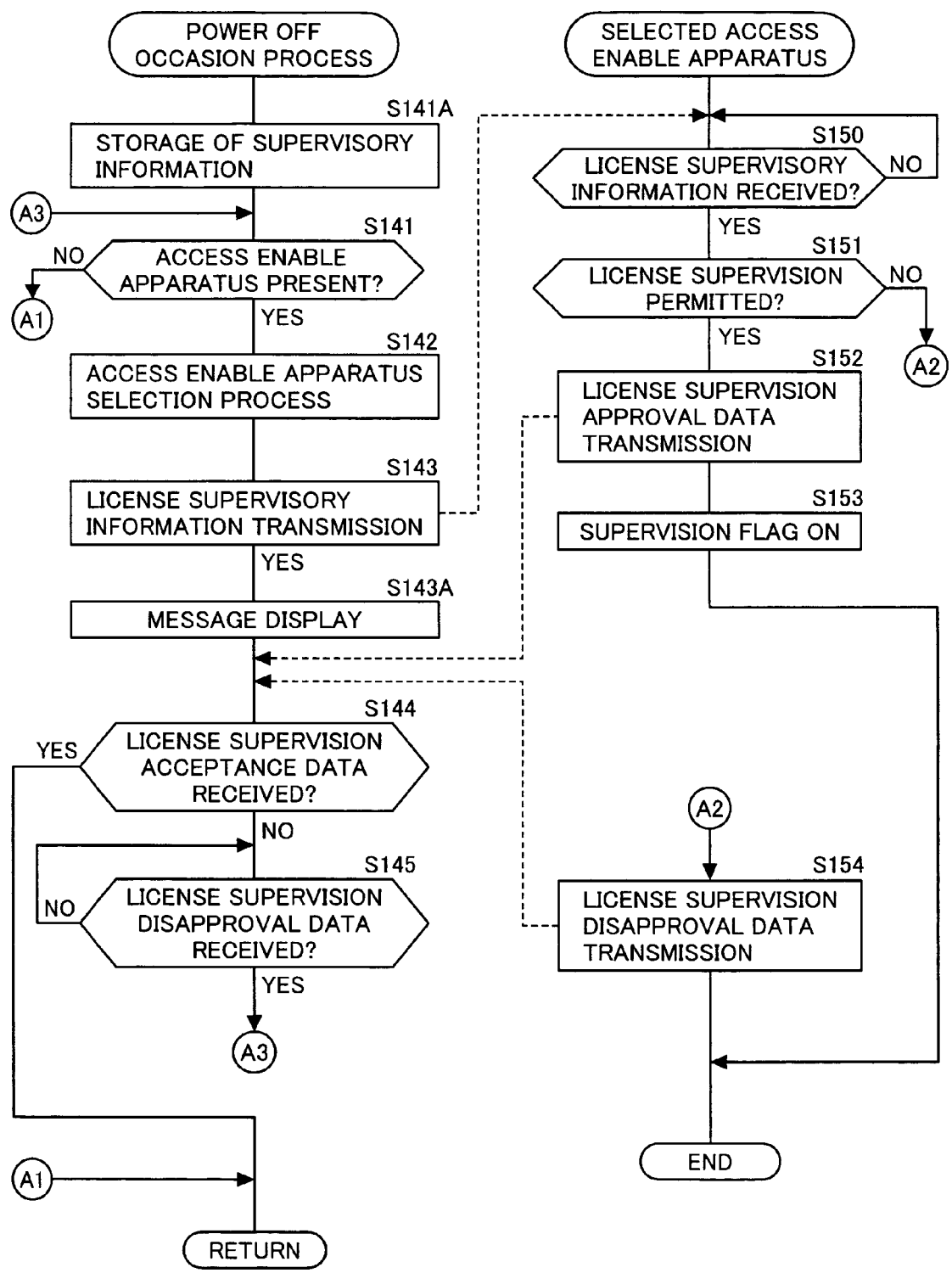
FIG. 8 is a flow chart of a power off occasion process.

The power off occasion process is carried out by the supervision apparatus. Referring to the flow chart of FIG. 8, control unit 110 stores supervisory information in storage unit 140 at step S141A. Supervisory information is, for example, information of a license supervisory table. When supervisory information is to be stored in storage unit 140, appropriate information such as the date of storage may be stored together as log information in storage unit 140. This advantageous as will be described hereinafter when the power of an MFP is newly turned on after the power of all access enable apparatuses is turned off (for example, the next day) and set at a supervisory mode. By executing just the process of confirming or correcting the table contents without having to newly generate a license supervisory table, the process to be carried out as a supervision apparatus can be effected promptly. Then, control proceeds to step S141.

At step S141, control unit 110 determines whether there is an access enable apparatus on network 210. When YES at step S141, control proceeds to step S142, otherwise (NO at step S141), this power off occasion process ends, and control returns to the process of FIG. 5. Step S140A subsequent to step S141 is conducted.

At step S142, an access enable apparatus selection process is carried out. In this process, control unit 110 selects an access enable apparatus based on a selection criterion when determination is made of the presence of a plurality of access enable apparatuses at the process of step S141. The access enable apparatus that is selected is also referred to as a selected access enable apparatus.

The selection criterion includes selecting an access enable apparatus located closest to the supervision apparatus on network 210.

The selection criterion includes selecting an access enable apparatus that has the greatest number of licenses of functions on network 210.

When determination is made of one access enable apparatus in the process of step S141, that identified access enable apparatus becomes the selected access enable apparatus.

Then, control proceeds to step S143.

At step S143, control unit 110 transmits license supervisory information based on a license supervisory table stored in storage unit 140 to the selected access enable apparatus. Then, control proceeds to step S143A.

At step S143A, control unit 110 causes display unit 162 to display a message image 400.

Figure 9:
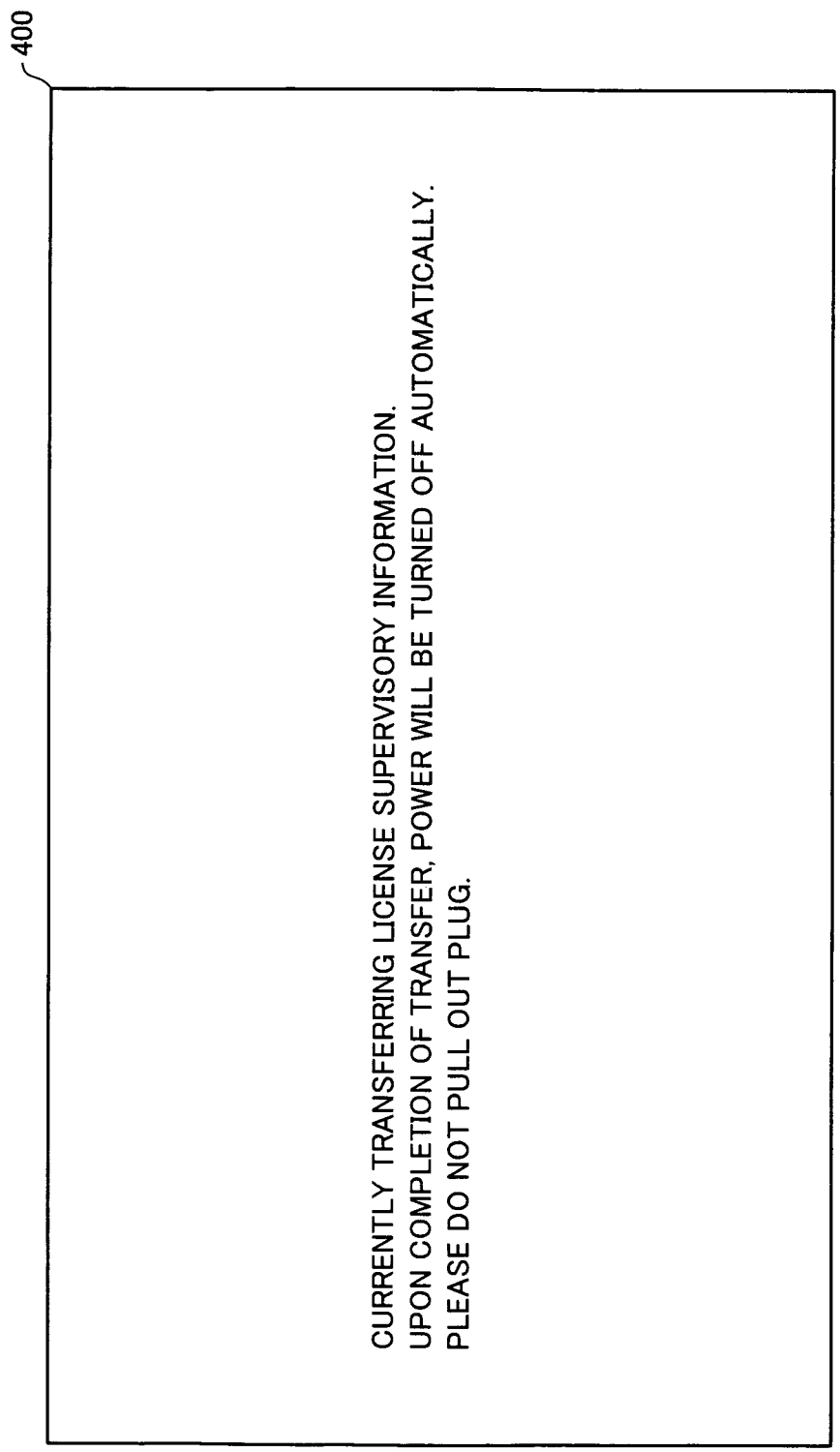
FIG. 9 represents a message image by way of example.

FIG. 9 represents an exemplified message image 400. Message image 400 represents a message indicating that license supervisory information is currently transferred. As indicated by the displayed message, transfer of the license supervisory information is initiated in response to a power off instruction from the user. At the end of the license supervisory information transfer, the power of the supervision apparatus is turned off automatically. This message is a warning to prevent the main power from being turned off during transfer of the license supervisory information.

Referring to FIG. 8 again, the process of step S150 is carried out at the selected access enable apparatus.

At step S150, control unit 110 determines whether license supervisory information has been received or not. When YES at step S150, control proceeds to step S151, otherwise (NO at step S150), the process of step S150 is repeated again.

At step S151, control unit 110 determines whether the selected access enable apparatus meets a predetermined condition, and whether license supervision is allowed or not. At this stage, the predetermined condition is, for example, the operating rate of control unit 110 being below a predetermined value (for example, 40%). In other words, determination is made that, if the operating rate of control unit 110 takes a high value approximating 100%, the apparatus corresponding to that control unit 110 cannot readily function as a supervision apparatus. When YES at step S151, control proceeds to S152, otherwise (NO at step S151), control proceeds to step S154.

At step S152, control unit 110 transmits license supervision approval data to the supervision apparatus. License supervision approval data indicates that license supervision is approved. Then, control proceeds to step S153.

At step S153, control unit 110 turns on the supervision flag provided in data temporary storage unit 120. Then, the process carried out at the selected access enable apparatus ends. At the completion of this process, the selected access enable apparatus becomes the supervision apparatus.

At step S154, control unit 110 transmits license supervision disapproval data to the supervision apparatus. This license supervision disapproval data indicates that license supervision is not approved. Then, the process carried out at the selected access enable apparatus ends.

At the supervision apparatus, control proceeds to step S144, subsequent to the process of step S143A.

At step S144, control unit 110 determines whether license supervision approval data has been received or not. When YES at step S144, the power off occasion process ends. Control returns to the process of FIG. 5 to proceed to step S140A, subsequent to step S140. When NO at step S144, control proceeds to step S145.

At step S145, control unit 110 determines whether license supervision disapproval data has been received or not. When YES at step S145, the process of step S141 is carried out again. In other words, a search is made for another access enable apparatus. When NO at step S145, the process of step S145 is carried out again.

Referring to FIG. 5 again, when the process of step S140 ends, control proceeds to step S140A.

At step S140A, control unit 110 turns off the main power of the supervision apparatus. Thus, the process of the supervision apparatus ends.

At the access enable apparatus, control proceeds to step S132, subsequent to the process of step S131.

At step S132, determination is made whether a power off instruction has been issued or not. Since the process thereof is similar to that of step S124, details thereof will not be repeated. When YES at step S132, control proceeds to step S134, otherwise (NO at step S132), the process of step S130 is carried out again.

At step S134, control unit 110 turns off the power of the access enable apparatus. Thus, the process carried out at the access enable apparatus ends.

By the process set forth above, the supervision apparatus transmits license supervision information to another access enable apparatus, before its main power is turned off. Thus, the main power is turned off only after the another access enable apparatus attains a state of allowing license supervision.

This is advantageous in that license supervision can be continued on network 210 until there is no MFP that is ON.

The process of an access enable apparatus issuing a function usage request towards the supervision apparatus (hereinafter, also referred to as function usage process) will be described hereinafter. In this case, a function usage request image is displayed by display unit 162 of the access enable apparatus.

A function usage request image 500 is an image to request usage of each of a plurality of functions utilizing, for example, the scanner function.

Figure 10:
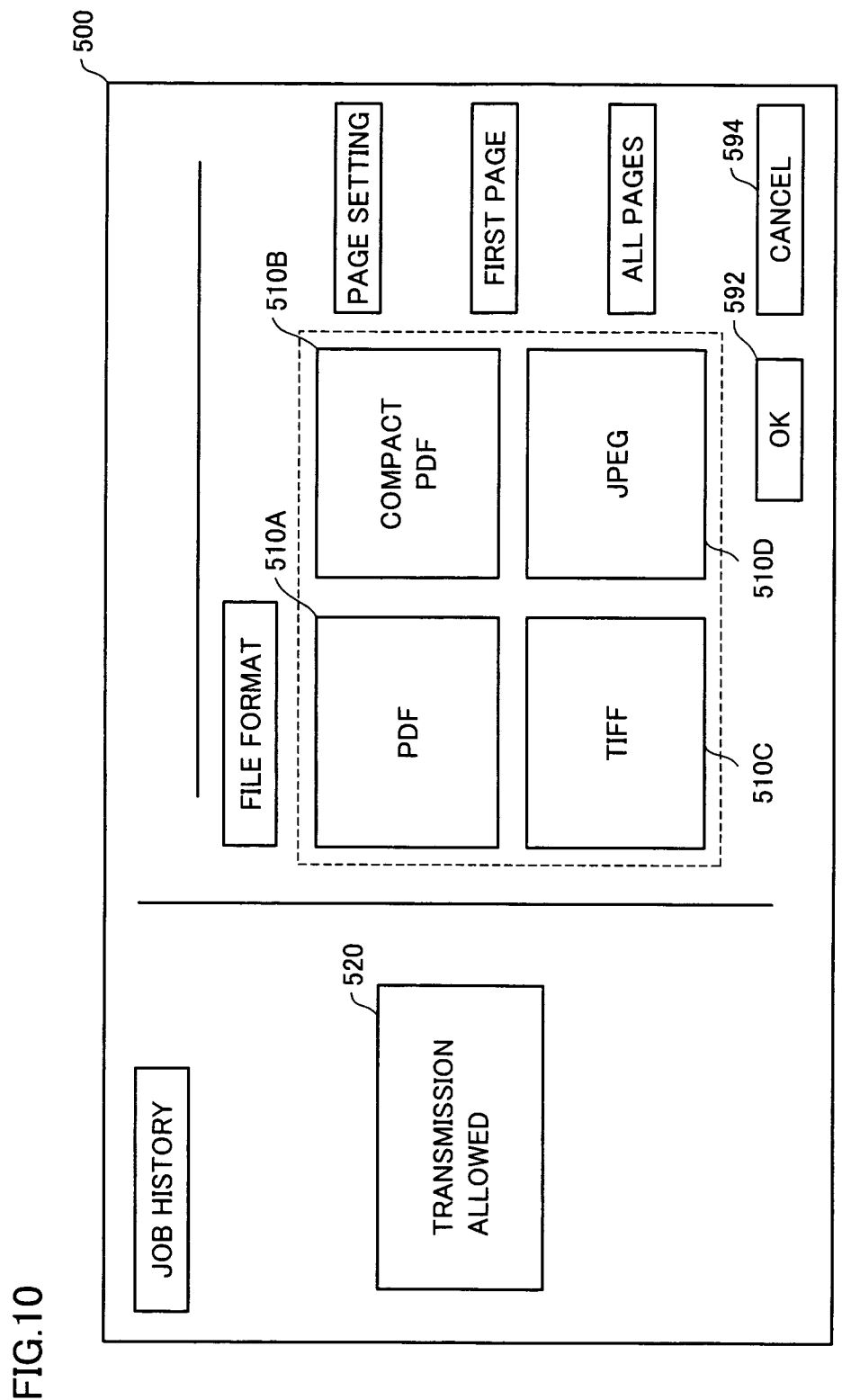
FIG. 10 represents a function usage request image.

Referring to FIG. 10, button images 510A, 510B, 510C and 510D, 592, 594, and a message image 520 are arranged at function usage request image 500.

Button image 510A is used to select the function of setting one image read out by scanner unit 170 in one file of a PDF® format. Button image 510B is used to select the function of setting a plurality of images read out by scanner unit 170 in one file in a PDF® format. Button image 510C is used to select the function of setting one image read out by scanner unit 170 in one file in a TIFF format. Button image 510D is used to select the function of setting one image read out by scanner unit 170 in one file of the JPEG format.

Button image 592 is used to request usage of a function selected through any one of button images 510A, 510B, 510C and 510D. Button image 594 is used to shift to another image.

Message image 520 is a region to display a message reflecting respective situations.

Figure 11:
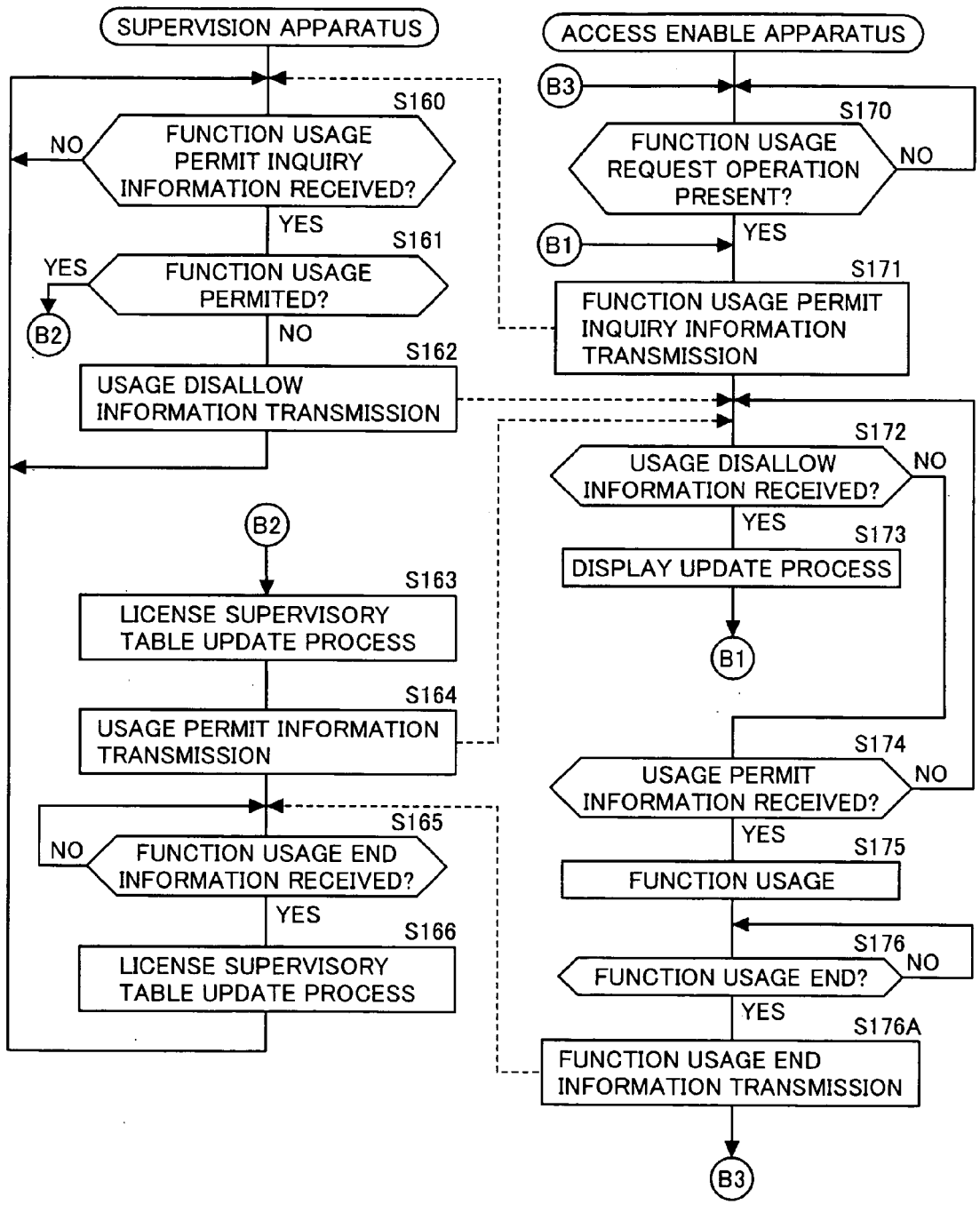
FIG. 11 is a flow chart of a function usage process.

FIG. 11 is a flow chart of a function usage process. This process of FIG. 11 carried out by the access enable apparatus is conducted independent of the process of the access enable apparatus set forth above. Referring to flow chart of FIG. 11, the process of step S170 is carried out at the access enable apparatus.

At step S170, determination is made whether a function usage request operation has been made or not. Specifically, control unit 110 determines whether the user has depressed button image 592, following depression of any one of the button images of 510A, 510B, 510C and 510D. When YES at step S170, control proceeds to step S171, otherwise (NO at step S170), the process of step S170 is carried out again.

At step S171, control unit 110 transmits function usage permit inquiry information to the supervision apparatus in order to inquire about the function selected by the function usage request operation at step S170, i.e. whether usage of the function of interest is permitted or not.

The process of FIG. 11 carried out by the supervision apparatus is conducted independent of the process of the supervision apparatus set forth above. At the supervision apparatus, the process of step S160 is first carried out.

At step S160, control unit 110 determines whether function usage permit inquiry information has been received or not. When YES at step S160, control proceeds to step S161, otherwise (NO at step S160), the process of step S160 is repeated.

At step S161, determination is made whether the function corresponding to the received function usage permit inquiry information (hereinafter, also referred to as inquired function) can be used or not. Specifically, control unit 110 determines whether the license of the inquired function is present or not by referring to the license supervisory table stored in storage unit 140. When YES at step S161, control proceeds to step S163, otherwise (NO at step S161), control proceeds to step S162.

In the process of step S161, it is assumed that the license supervisory table is, for example, license supervisory table T200A of FIG. 3D. Further, it is assumed that the inquired function corresponds to, for example, function 7 of FIG. 3D. Since the number of licenses corresponding to function 7 is 0 in this case, the condition of step S161 is not met, and control proceeds to step S162.

At step S162, control unit 110 transmits usage disallow information indicating that the inquired function cannot be used to the access enable apparatus that has transmitted the function usage permit inquiry information. Then, the process of step S160 is carried out again.

In the process of step S161, it is assumed that the license supervisory table is, for example, license supervisory table T200A of FIG. 3D. Further, it is assumed that the inquired function corresponds to, for example, function 6 of FIG. 3D. Since the number of the licenses of function 6 is 2, the condition of step S161 is met, and control proceeds to step S163.

At step S163, a license supervisory table update process is carried out. In this process, the license supervisory table is updated by decrementing the number of licenses corresponding to the inquired function by 1 in the license supervisory table stored in storage unit 140. Then, control proceeds to step S164.

At step S164, control unit 110 transmits usage permit information indicating that the inquired function can be used to the access enable apparatus that has transmitted the function usage permit inquiry information.

At the access enable apparatus, control proceeds to step S172, following the process of step S171.

At step S172, control unit 110 determines whether usage disallow information has been received or not. When YES at step S172, control proceeds to step S173, otherwise (NO at step S172), control proceeds to step S174.

At step S173, a display update process is carried out. In this process, control unit 110 causes display unit 162 to display an image 500A that will be described afterwards.

Figure 12:
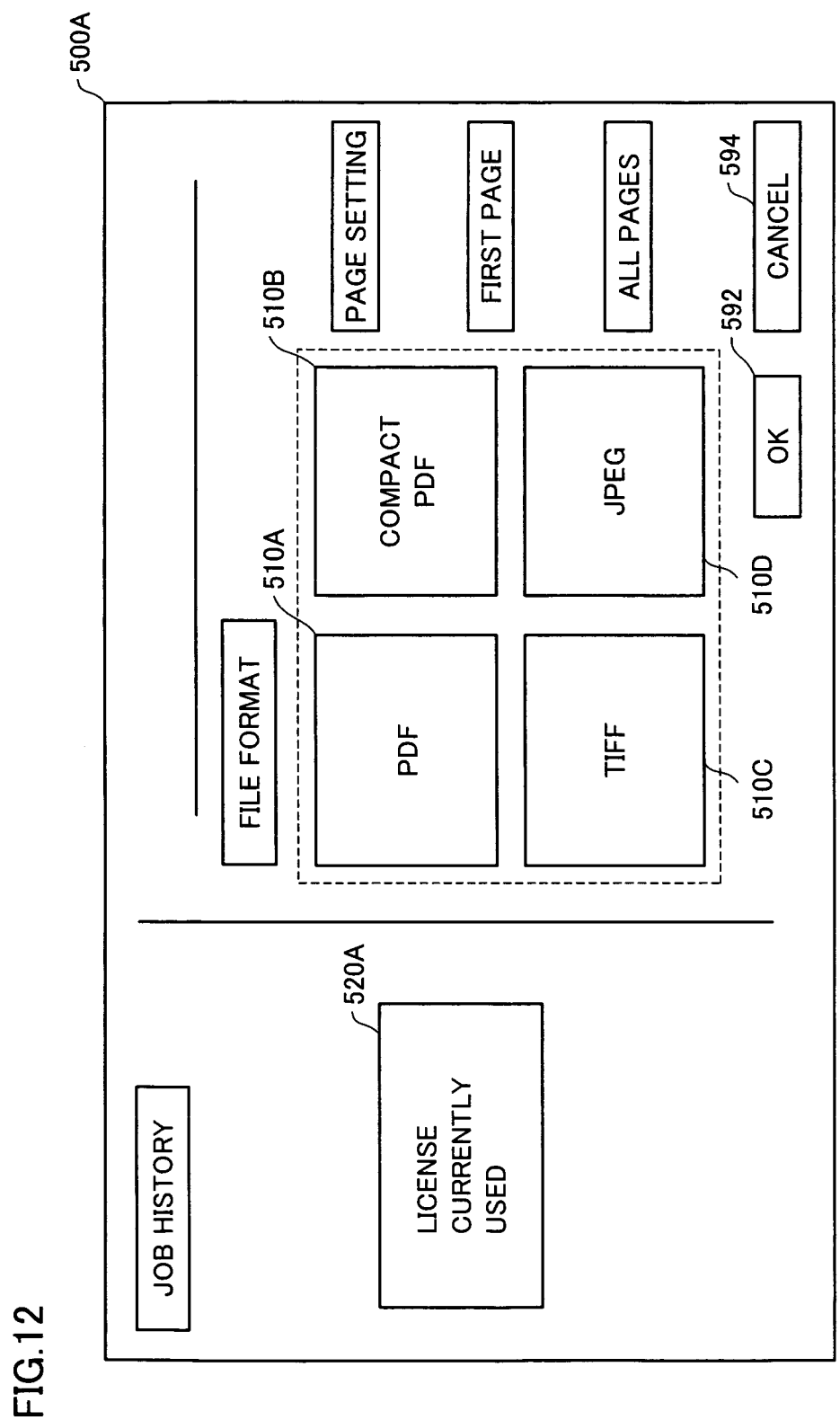
FIG. 12 represents an image displayed by a display unit.

Referring to FIG. 12, image 500A differs from function usage request image 500 in that a message image 520A is arranged instead of message image 520. The remaining elements are similar to those of function usage request image 500. Therefore, detailed description thereof will not be repeated.

At message image 520A, a message indicating that the license of the function corresponding to the transmitted function usage permit inquiry information is currently used.

Referring to FIG. 11 again, following the process of step S173, the process of step S171 is carried out again. In other words, function usage permit inquiry information is repeatedly transmitted towards the supervision apparatus until the function corresponding to the function usage permit inquiry information is allowed to be used.

When NO at step S172 set forth above, control proceeds to step S174.

At step S174, control unit 110 determines whether usage permit information has been received or not. When YES at step S174, control proceeds to step S175, otherwise (NO at step S174), the process of step S172 is carried out again.

At step S175, control unit 110 uses the function corresponding to the transmitted function usage permit inquiry information. Then, control proceeds to step S176.

At step S176, control unit 110 determines whether usage of the function corresponding to the transmitted function usage permit inquiry information has ended or not. When YES at step S176, control proceeds to step S176A, otherwise (NO at step S176), the process of step S176 is repeated.

At step S176A, control unit 110 transmits function usage end information indicating that usage of the function has ended to the supervision apparatus. Then, the process of step S170 is carried out again.

At the supervision apparatus, control proceeds to step S165, following the process of step S164.

At step S165, control unit 110 determines whether function usage end information corresponding to the transmitted usage permit information has been received or not. When YES at step S165, control proceeds to step S166, otherwise (NO at step S165), the process of step S165 is carried out again.

At step S166, a license supervisory table update process is carried out. In this process, the license supervisory table stored in storage unit 140 is updated by restoring the license number corresponding to the inquired function that has been decremented at step S163. Then, the process of step S160 is carried out.

In the present embodiment, the supervision apparatus supervises account information, address information, access right information, and the like in addition to the license supervisory information set forth above. Account information is the information for user authorization and to grasp the apparatus usage status for each user. Address information includes the facsimile number information, the electronic mail address information, and the like. Access right information includes supervision of an apparatus (user) that has access right in storage unit 140. The license supervisory information, account information, address information and access right information are generically referred to as supervisory information.

The present embodiment is applicable to the case where the supervision apparatus supervises supervisory information.

An account table indicating account information will be described hereinafter as an example of supervisory information.

Figures 13, 14:
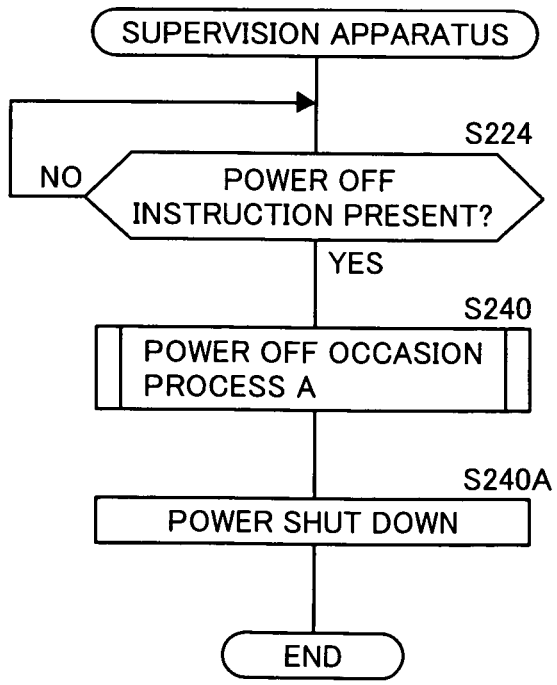
FIG. 13 represents an account table by way of example.
FIG. 14 is a flow chart of a supervisory process B1.

Referring to an account table T300 shown in FIG. 13, an IP address is the IP address of MFP 100 connected to network 210. For example, there are four users that can use MFP 100 having the IP address of 150.16.119.104. When user authorization is required when connecting on network 210, MFP 100 transmits the user name and a password corresponding to the user name to the supervision apparatus to be connected on network 210. Thus, usage of other apparatuses connected on network 210 is allowed.

The information to grasp the apparatus usage status for each user mentioned above includes, for example, the number of prints for each user. The relevant information is stored in the account supervisory table. The generation process and update process of the account supervisory table are carried out in a manner similar to that of the license supervisory table generation process and license supervisory table update process described in conjunction with FIG. 5.

The process of the supervision apparatus supervising supervisory information (hereinafter, also referred to as a supervisory process B1) will be described hereinafter. It is assumed that supervisory information is prestored in storage unit 140 in each MFP connected on network 210.

Referring to the flow chart of FIG. 14, step S224 is similar to that of step S124 set forth above. Therefore, detailed description thereof will not be provided. When YES at step S224, control proceeds to step S240, otherwise (NO at step S224), the process of step S224 is carried out again.

At step S240, a power off occasion process A is carried out.

Figure 15:
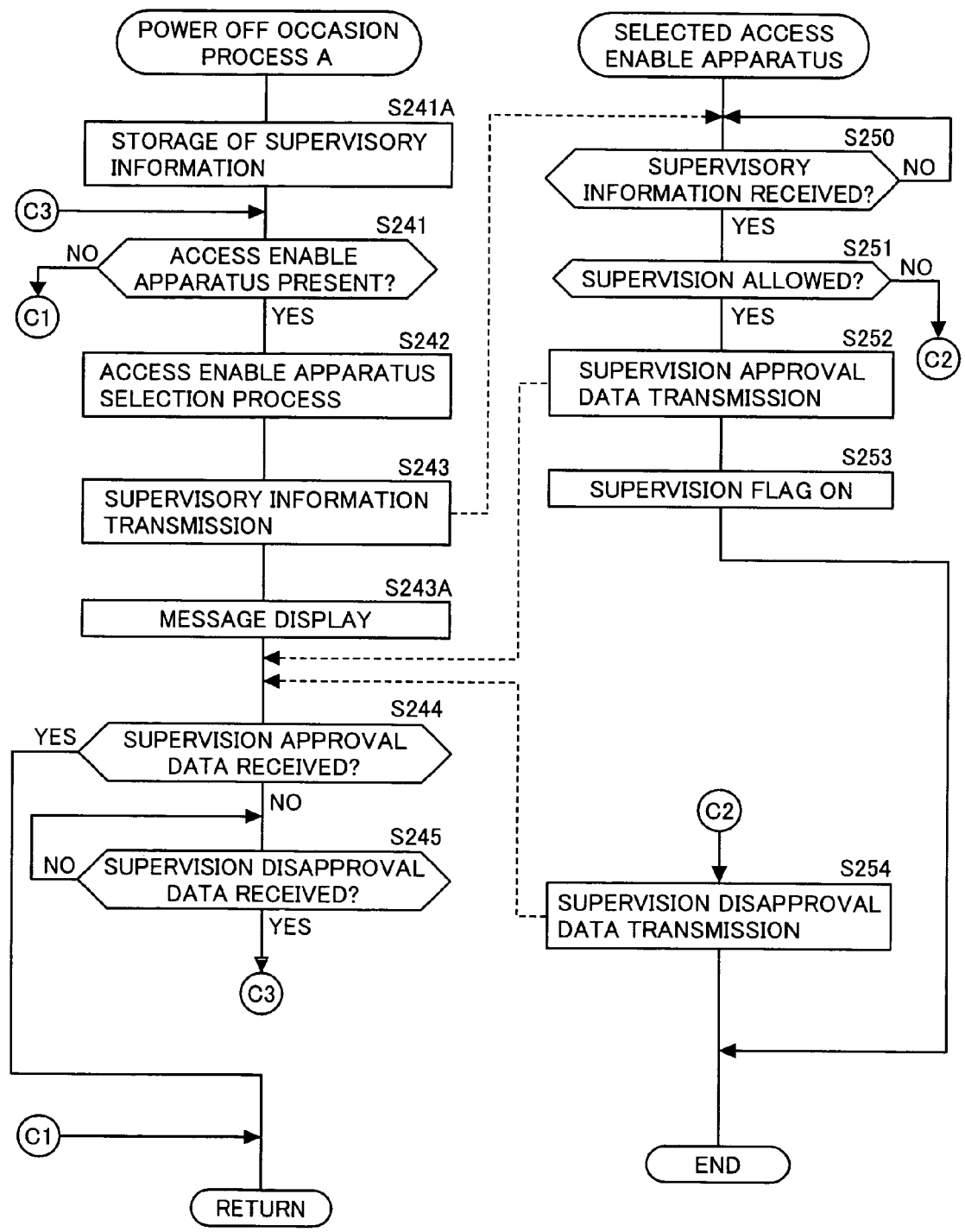
FIG. 15 is a flow chart of a power off occasion process A.

Power off occasion process A is carried out by the supervision apparatus. Referring to the flow chart of FIG. 15, control unit 110 stores supervisory information in storage unit 140 at step S241A. Supervisory information is, for example, account supervisory table information. When supervisory information is to be stored in storage unit 140, appropriate information such as the date of storage may be stored together as log information. Since account information should not be lost, it must be stored in a reusable form even if all the access enable apparatuses are turn off.

This process is advantageous as will be set forth below when a MFP is newly turned on and set at a supervisory mode subsequent to the power of all access enable apparatuses being turned off (for example, on the next day). Specifically, network operation can be implemented with no delay based on the supervisory information stored in storage unit 140 of the MFP set at the supervisory mode. Then, control proceeds to step S241.

Step S241 is similar to the process of step S141 set forth above. Therefore, details thereof will not be provided. When YES at step S241, control proceeds to step S242, otherwise (NO at step S241), the power off occasion process A ends. Control returns to the process of FIG. 14, and proceeds to step S240A, subsequent to step S240.

At step S242, an access enable apparatus selection process is carried out. In this process, when determination is made of the presence of a plurality of access enable apparatuses based on the process of step S241, control unit 110 selects an access enable apparatus based on the selection criterion set forth above. In the following, an access enable apparatus that has been selected is also referred to as a selected access enable apparatus.

When determination is made that there is one access enable apparatus by the process of step S241, that access enable apparatus becomes the selected access enable apparatus. Then, control proceeds to step S243.

At step S243, control unit 110 transmits the supervisory information stored in storage unit 140 to the selected access enable apparatus. Then, control proceeds to step S243A.

At step S243A, control unit 110 causes display unit 162 to display a message image 400A.

Figure 16:
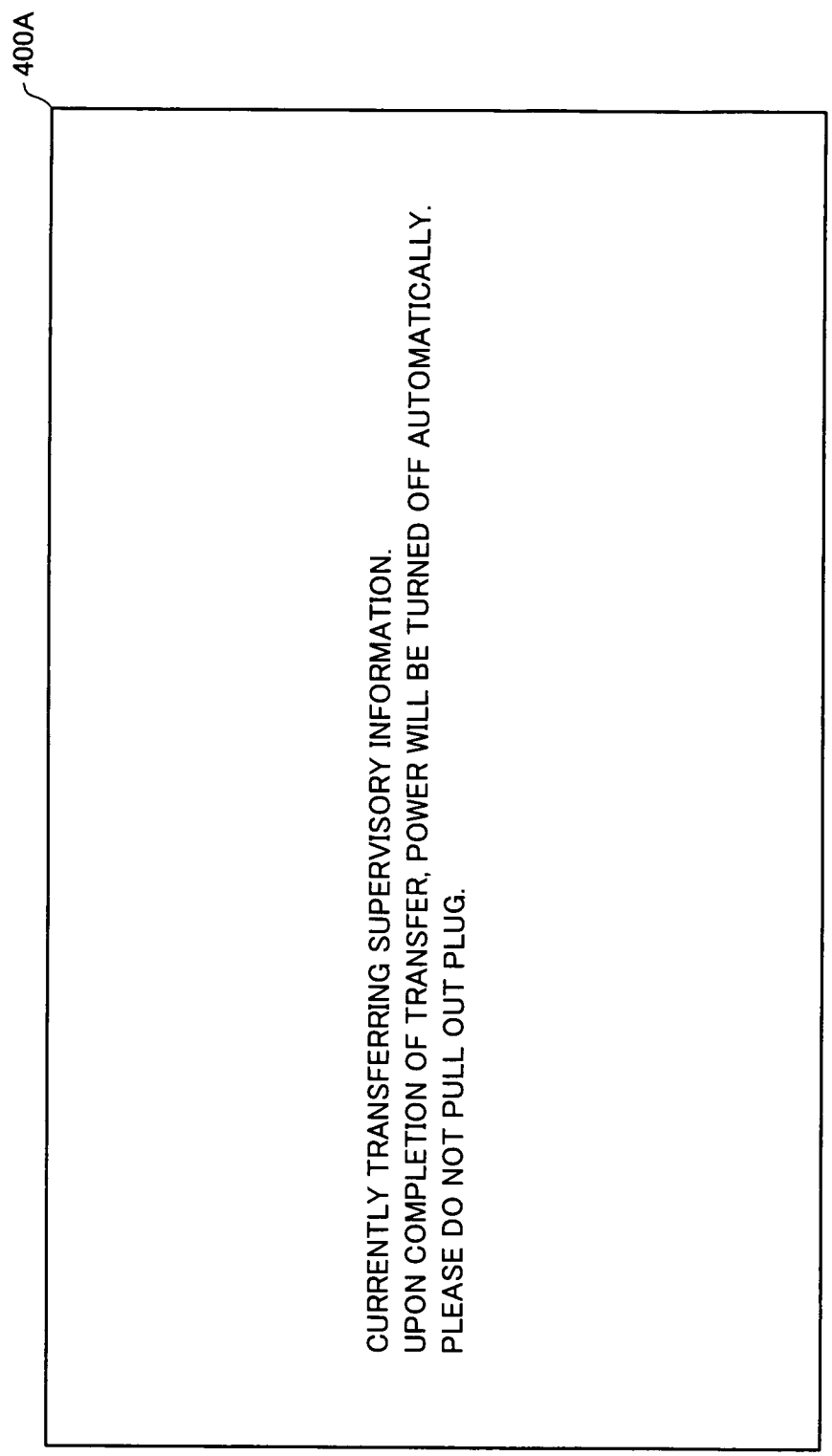
FIG. 16 represents a message image by way of example.

Message image 400A shown in FIG. 16 is an image displayed with the message that supervisory information is currently being transferred.

Referring to FIG. 15 again, the process of step S250 is carried out at the selected access enable apparatus.

At step S250, control unit 110 determines whether supervisory information has been received or not. When YES at step S250, control proceeds to step S251, otherwise (NO at step S250), the process of step S250 is repeated.

At step S251, control unit 110 determines whether the selected access enable apparatus meets the predetermined condition set forth above, and whether supervision of supervisory information is allowed or not. When YES at step S251, control proceeds to step S252, otherwise (NO at step S251), control proceeds to step S254.

At step S252, control unit 110 transmits supervision approval data to the supervision apparatus. The supervision approval data is data indicating that supervision of supervisory information is approved. Then, control proceeds to step S253.

At step S253, control unit 110 turns on the supervision flag provided in data temporary storage unit 120. Then, the process carried out at the selected access enable apparatus ends. In this case, the selected access enable apparatus becomes the supervision apparatus.

At step S254, control unit 110 transmits supervision disapproval data to the supervision apparatus. Supervision disapproval data is data indicating that supervision of supervisory information is not approved. Then, the process carried out at the selected access enable apparatus ends.

At the supervision apparatus, control proceeds to step S244, subsequent to the process of step S243A.

At step S244, control unit 110 determines whether supervision approval data has been received or not. When YES at step S244, the power off occasion process ends. Control returns to the process of FIG. 14 to proceed to step S240A, subsequent to step S240. When NO at step S244, control proceeds to step S245.

At step S245, control unit 110 determines whether supervision disapproval data has been received or not. When YES at step S245, the process of step S241 is carried out again, otherwise (NO at step S245), the process of step S245 is carried out again.

Referring to FIG. 14 again, control proceeds to step S240A when the process of step S240 ends.

At step S240A, control unit 110 turns off the power of the supervision apparatus. Thus, the process of the supervision apparatus ends.

Figure 17:
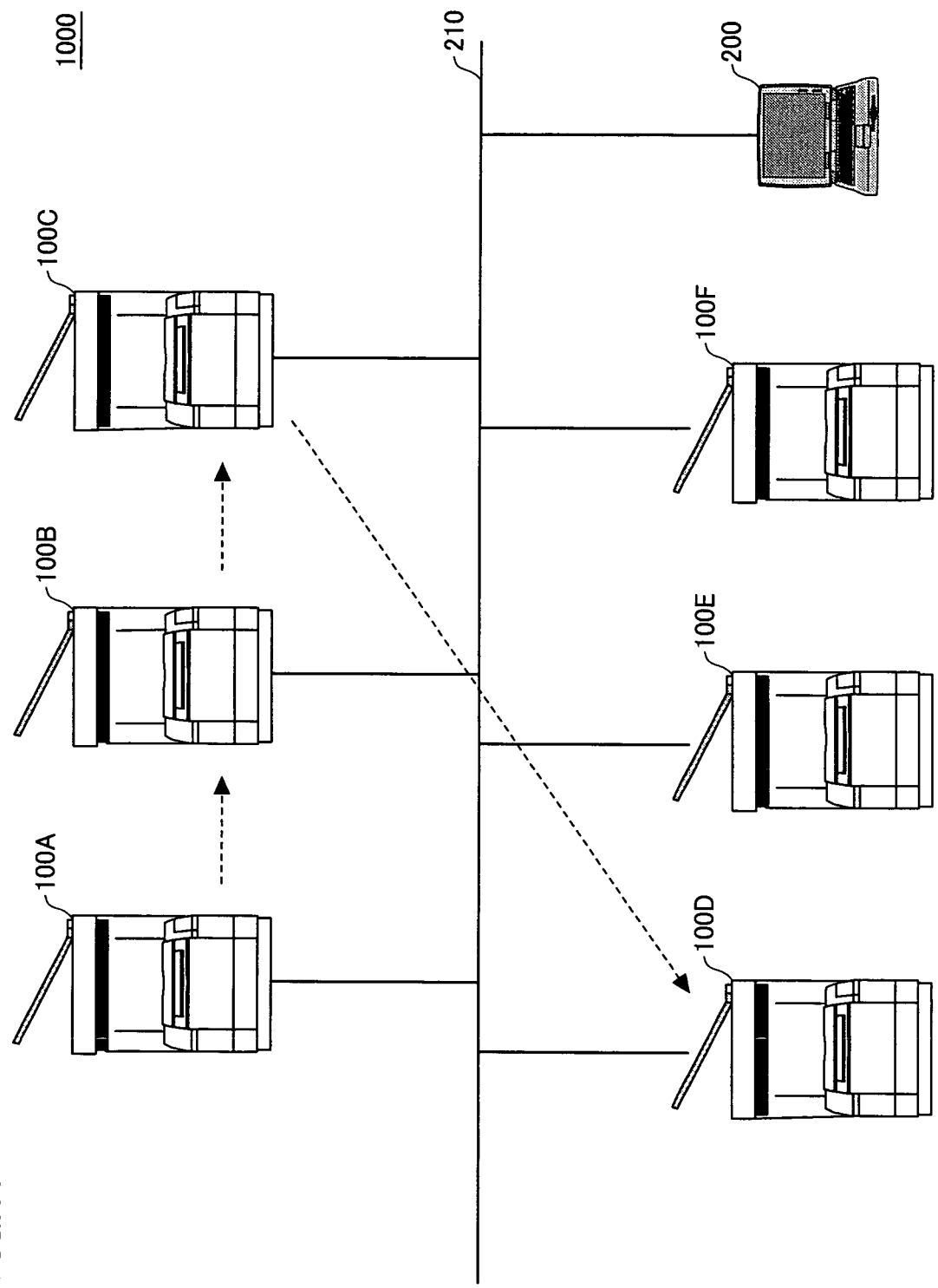
FIG. 17 represents transfer of supervisory information when MFPs connected on a network are sequentially turned off.

FIG. 17 represents the manner of supervisory information transfer when MFPs connected on network 210 are sequentially turned off. Here, it is assumed that MFP 100A is the supervision apparatus, and MFPs 100B, 100C, and 100D are access enable apparatuses.

When MFPs 100A, 100B, and 100C are sequentially turned off, supervisory information is sequentially transferred from MFP 100A to MFP 100B, MFP 100C and MFP 100D, in accordance with the process set forth above.

By the above-described process, the supervision apparatus transmits supervisory information to another access enable apparatus before being turned off. The current supervision apparatus has the power turned off only after the another access enable apparatus attains a state of supervising supervisory information.

Therefore, there is provided the advantage of continuing supervision of supervisory information until there is no MFP that is ON.

In accordance with the present embodiment, it is not necessary to provide an apparatus with a server function that must have the power constantly turned on for supervision of supervisory information. In other words, extra power consumption can be avoided to allow reduction in cost.

Thus, the present embodiment provides the advantage of supervising information of a plurality of apparatuses connected on the network more reliably at low cost.

Second Embodiment

The first embodiment is directed to a supervision apparatus corresponding to an MFP that is first turned on to attain a data access enable state with respect to network 210 among a plurality of MFPs connected on network 210. The second embodiment is directed to a supervision apparatus corresponding to an MFP that is newly turned on to attain a data access enable state with respect to network 210 in addition to a plurality of MFPs connected on network 210.

The network system of the second embodiment is similar to network system 1000 of the first embodiment. Therefore, detailed description thereof will not be repeated.

In network system 1000 of the second embodiment, it is assumed that the power of MFP 100A and MFP 100B is sequentially turned on. Therefore, it is assumed that MFP 100B operates as a supervision apparatus, and MFP 100A operates as an access enable apparatus. The process (hereinafter, also referred to as supervision process B2) when another MFP 100C becomes an access enable apparatus (hereinafter, also referred to as new access enable apparatus) will be described hereinafter.

Figure 18:
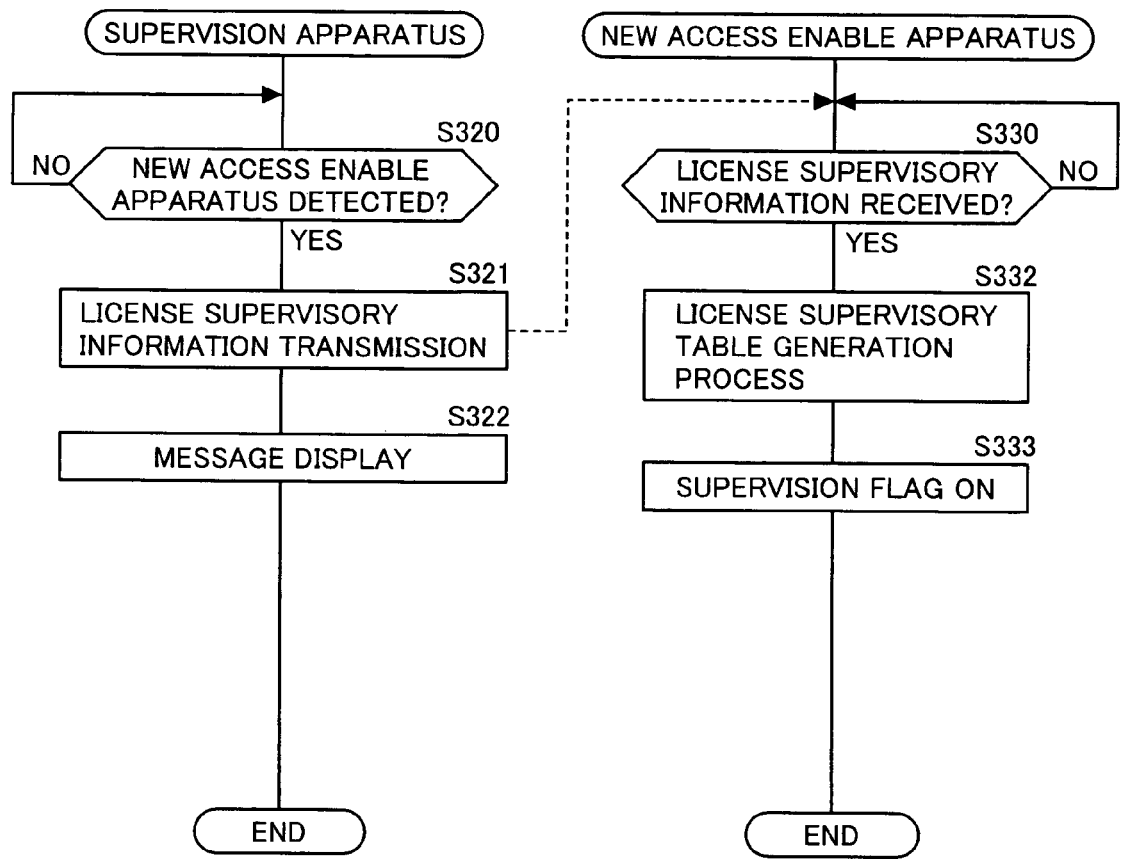
FIG. 18 is a flow chart of a supervisory process B2.

Referring to the flow chart of FIG. 18, the process of step S320 is carried out at the supervision apparatus.

At step S320, control unit 110 determines whether a new access enable apparatus has been detected on network 210. When YES at step S320, control proceeds to step S321, otherwise (NO at step S320), the process of step S320 is repeated.

At step S321, control unit 110 transmits license supervisory information based on the license supervisory table stored in storage unit 140 to the new access enable apparatus. Then, control proceeds to step S322.

At step S322, control unit 110 causes display unit 162 to display a message image 400. When transmission of license supervisory information ends, the process at the supervision apparatus ends.

At the new access enable apparatus, the process of step S330 is carried out.

At step S330, a process similar to that of step S150 set forth above is carried out. Therefore, details thereof will not be repeated. When YES at step S330, control proceeds to steps S332, otherwise (NO at step S330), the process of step S330 is repeated.

At step S332, a license supervisory table generation process is carried out. In this process, a license supervisory table is generated by adding the data of the license table of the new access enable apparatus to the data in the license supervisory table based on the license supervisory information received at step S330.

Specifically, control unit 110 generates a license supervisory table based on data in the license table stored in storage unit 140 and the received license supervisory information.

It is assumed that the license table possessed by the new access enable apparatus corresponds to license table T110 of FIG. 3C. It is assumed that the license supervisory table based on the received license supervisory information corresponds to license supervisory table T200 of FIG. 3B. Therefore, the license supervisory table generated by control unit 110 corresponds to license supervisory table T200A.

Control unit 110 stores the generated license supervisory table T200A in storage unit 140. Then, control proceeds to step S333.

At step S333, control unit 110 turns on the supervision flag provided in data temporary storage 120. Then, the process at the new access enable apparatus ends. In this case, the new access enable apparatus becomes the supervision apparatus.

The present embodiment is applicable to the case where the supervision apparatus supervises the supervisory information set forth above.

The process of supervising supervisory information by the supervision apparatus (hereinafter, also referred to as supervisory process C2) will be described hereinafter.

Figure 19:
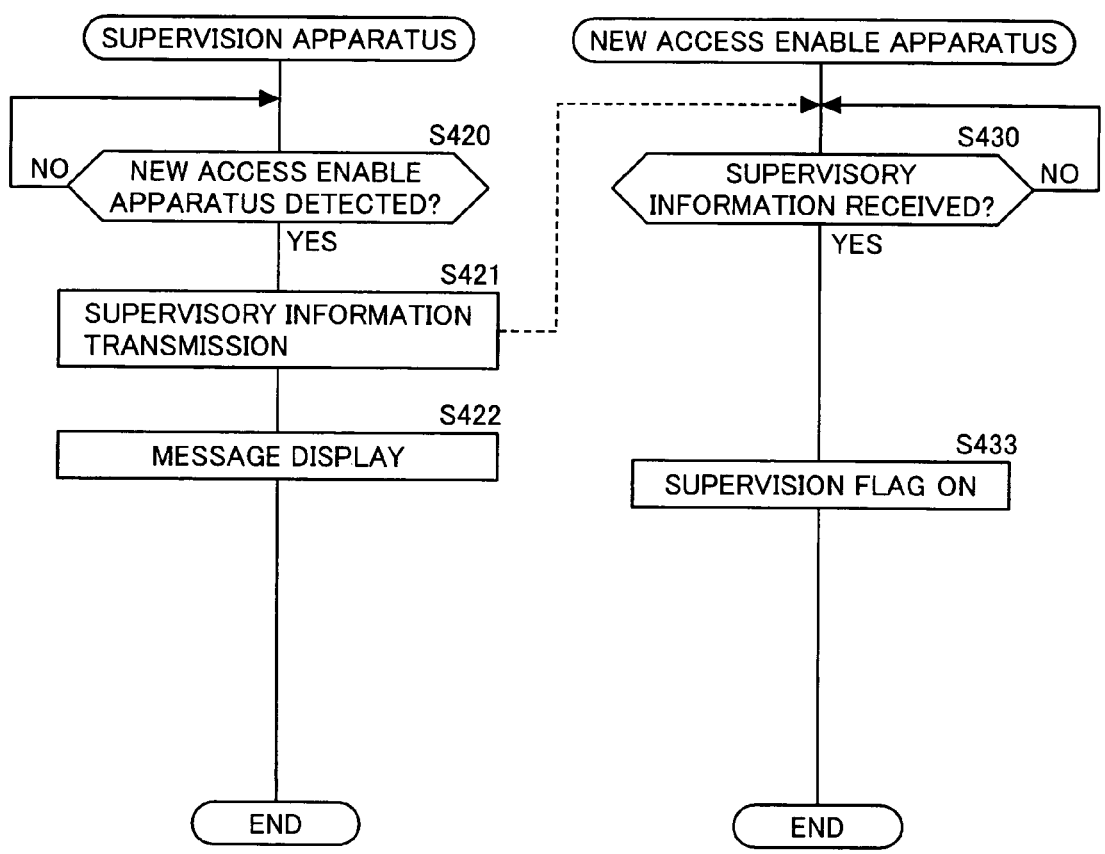
FIG. 19 is a flow chart of a supervisory process C2.

Referring to the flow chart of FIG. 19, the process of step S420 is carried out at the supervision apparatus.

At step S420, a process similar to that of step S320 set forth above will be carried out. Therefore, details thereof will not be repeated. When YES at step S420, control proceeds to step S421, otherwise (NO at step S420), the process of step S420 is repeated.

At step S421, control unit 110 transmits supervisory information stored in storage unit 140 to the new access enable apparatus. Then, control proceeds to step S422.

At step S422, control unit 110 causes display unit 162 to display message image 400A. When transmission of supervisory information ends, the process carried out at the supervision apparatus ends.

At the new access enable apparatus, the process of step S430 is carried out. At step S430, control unit 110 determines whether supervisory information has been received or not. When YES at step S430, control proceeds to step S433, otherwise (NO at step S433), the process of step S430 is repeated.

Figure 20:
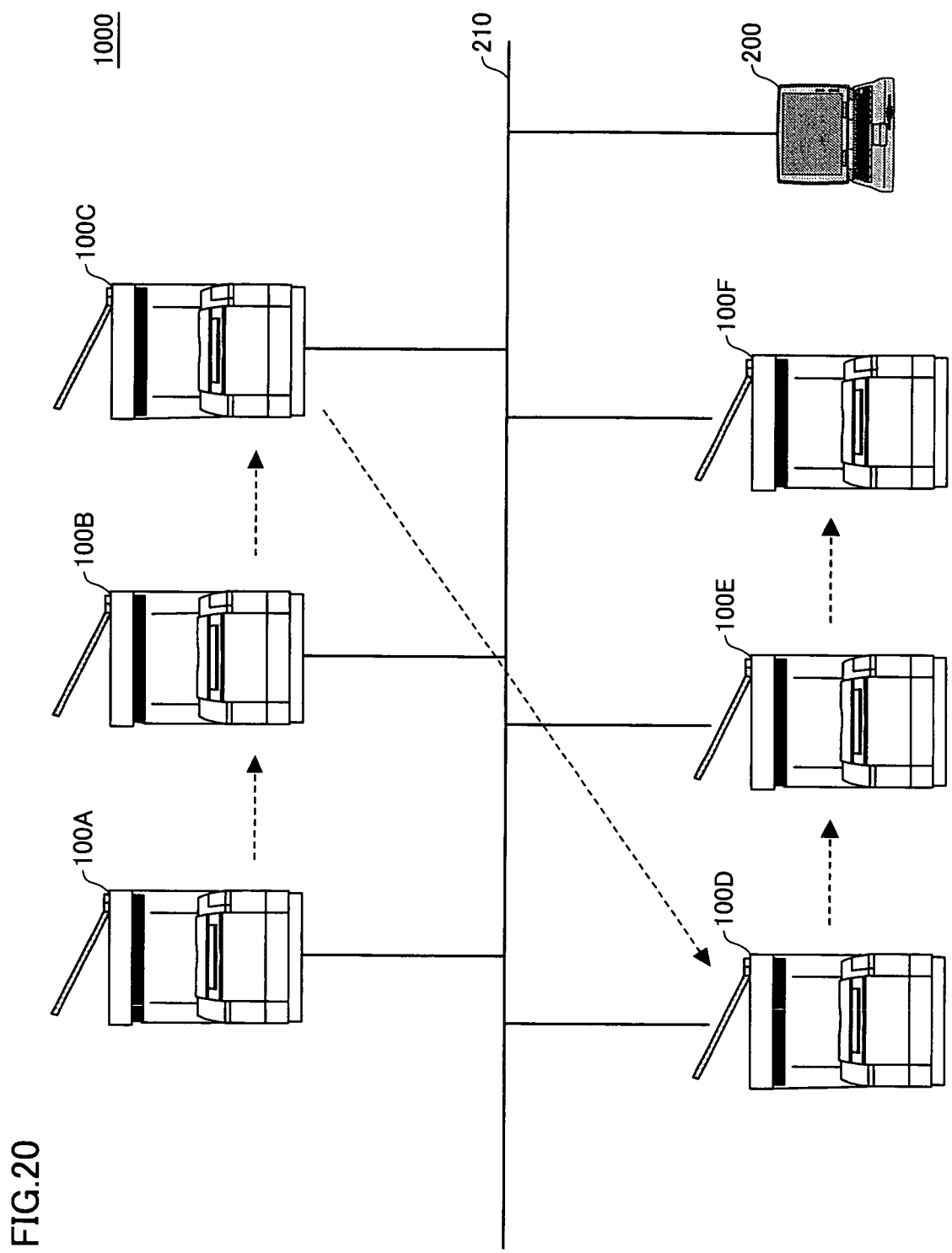

At step S433, control unit 110 turns on the supervision flag provided in data temporary storage unit 120. Then, the process at the new access enable apparatus ends. In this case, the new access enable apparatus becomes the supervision apparatus FIG. 20 represents the manner of supervisory information transfer when MFPs connected to network 210 are sequentially turned on. It is assumed that the power of MFPs 100A, 100B, 100C, 100D, 100E and 100F is sequentially turned on.

Referring to FIG. 20, when the power of MFPs 100A, 100B, 100C, 100D, 100E and 100F is sequentially turned on, supervisory information will be sequentially transferred from MFP 100A to MFPs 100B, 100C, 100D, 100E and 100F, in accordance with the process set forth above.

In the present embodiment, the MFP that has the power newly turned on to attain a data access enable state with respect to network 210 among the plurality of MFPs connected on network 210 is sequentially taken as a supervision apparatus.

In the previous first embodiment, identification had to be made periodically whether there is a new access enable apparatus on network 210 for the purpose of the MFP that has become the supervision apparatus to obtain license information of the new access enable apparatus.

In the second embodiment, the new access enable apparatus automatically receives supervisory information from the supervision apparatus to become the supervision apparatus. Therefore, the new access enable apparatus that has become the supervision apparatus does not have to access network 210 periodically, as in the first embodiment.

Therefore, the second embodiment provides the advantage that extra load is not exerted on the network.

Third Embodiment

In the previous first and second embodiments, there is only one MFP that possesses supervisory information. In the third embodiment, the supervisory information is shared by a plurality of MFPs. In the present embodiment, the MFP that has the power first turned on to attain a data access enable state with respect to network 210, among the plurality of MFPs connected on network 210, becomes the supervision apparatus, likewise the first embodiment. It is assumed that MFP 100A is first turned on in network system 1000.

Therefore, MFP 100A becomes the supervision apparatus in accordance with the process of FIG. 4.

The process of the supervision apparatus of the third embodiment will be described hereinafter. The supervision apparatus process is referred to as supervisory process A3 in the third embodiment.

Figure 21:
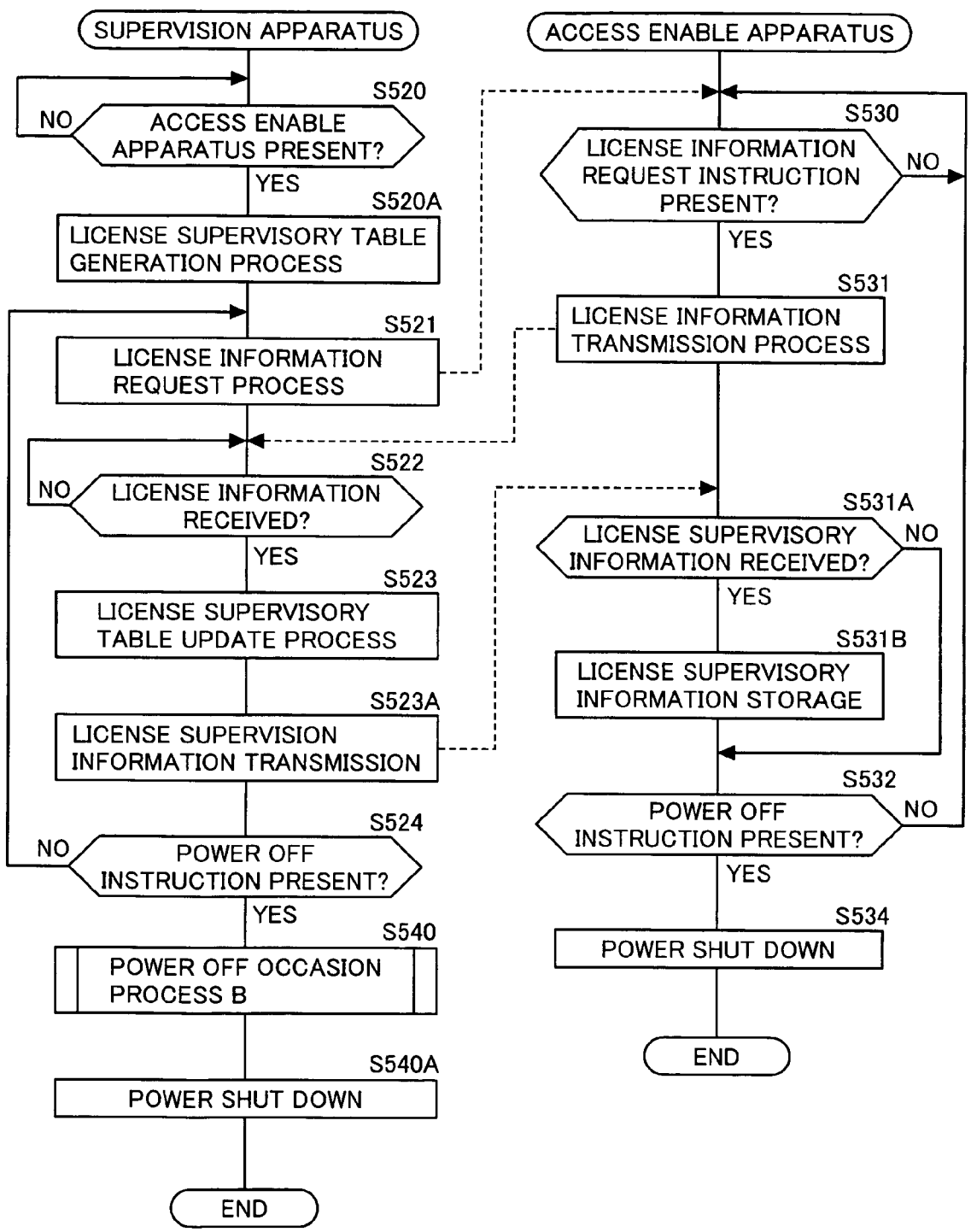
FIG. 21 is a flow chart of a supervisory process A3.

Referring to the flow chart of FIG. 21, the process of step S520 is carried out at the supervision apparatus.

At step S520, a process similar to that of step S120 set forth above is carried out. Therefore, details thereof will not be repeated. When YES at step S520, control proceeds to step S520A, otherwise (NO at step S520), the process of step S520 is repeated.

At step S520A, a process similar to that of step S120A set forth above is carried out. Therefore, details thereof are not repeated. Then, control proceeds to step S521.

At step S521, a license information request process is carried out. In this process, control unit 110 transmits to all the access enable apparatuses a license information request instruction to request the license information possessed by each of all the access enable apparatuses.

At the access enable apparatus, the process of step S530 is carried out.

At step S530, a process similar to that of step S130 set forth above is carried out. Therefore, details thereof will not be repeated. When YES at step S530, control proceeds to step SS531, otherwise (NO at step S531), the process of step S530 is repeated.

At step S531, a license information transmission process is carried out. In this process, license information based on a license table stored in storage unit 140 is transferred to the supervision apparatus, likewise the process of step S131 set forth above.

At the supervision apparatus, control proceeds to step S522, following the process of step S521.

At step S522, a process similar to that of step S122 set forth above is carried out. Therefore details thereof will not be repeated. When YES at step S522, control proceeds to step S523, otherwise (NO at step S522), the process of step S522 is carried out again.

At step S523, a license supervisory table update process similar to that of step S123 set forth above is carried out. Therefore, detailed description thereof will not be repeated. Then, control proceeds to step S523A.

At step S523A, control unit 110 transmits license supervisory information based on the license supervisory table stored in storage unit 140 to all access enable apparatuses.

At the access enable apparatus, control proceeds to step S531A, following the step of step S531.

At step S531A, control unit 110 determines whether license supervisory information has been received or not. When YES at step S531A, control proceeds to step S531B, otherwise (NO at step S531A), control proceeds to step S532.

At step S531B, control unit 110 stores the received license supervisory information in storage unit 140. When license supervisory information is already stored in storage unit 140, the former license supervisory information is rewritten by the received license supervisory information.

At the supervision apparatus, control proceeds to step S524, following the process of step S523A.

At step S524, a process similar to that of step S124 set forth above is carried out. Therefore, details thereof will not be repeated. When YES at step S524, control proceeds to step S540, otherwise (NO at step S524), the process of step S521 is carried out again.

The process of steps S521, S522, S523 and S523A is repeated until the condition of step S524 is met. In other words, the license supervisory table is updated according to the increase or decrease of access enable apparatuses on network 210.

License supervisory information based on the latest license supervisory table is transmitted to all access enable apparatuses.

At step S540, a power off occasion process B is carried out.

Figure 22:
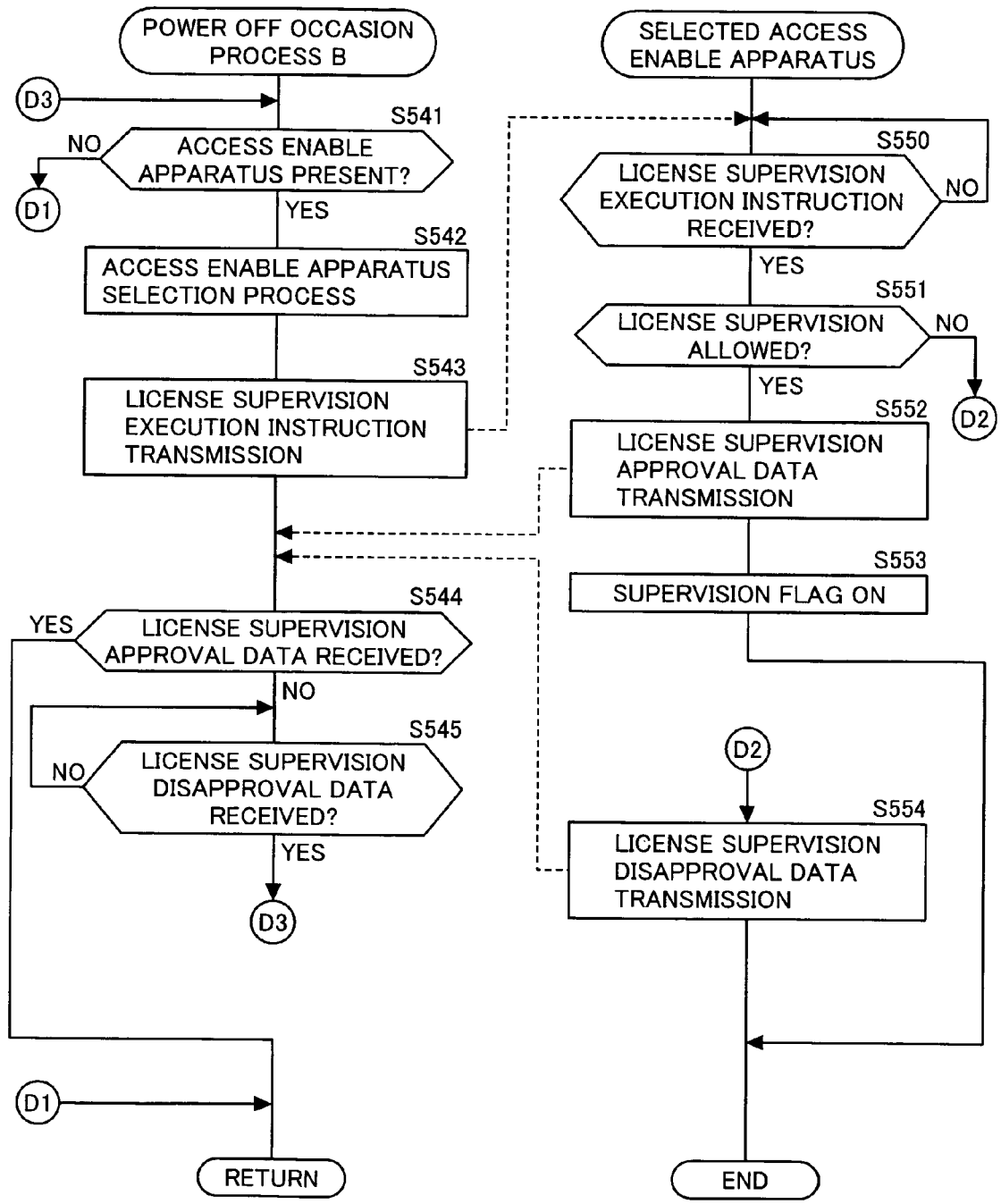
FIG. 22 is a flow chart of a power off occasion process B.

Referring to the flow chart of FIG. 22, a process similar to that of step S141 set forth above is carried out at step S541. Therefore, details thereof will not be repeated. When YES at step S541, control proceeds to step S542, otherwise (NO at step S541), the power off occasion process B ends. Control returns to the process of FIG. 21 to proceed to step S540A, subsequent to step S540.

At step S542, an access enable apparatus selection process similar to that of step S142 set forth above is carried out to determine a selected access enable apparatus. Then, control proceeds to step S543.

At step S543, control unit 110 transmits a license supervision execution instruction to carry out license supervision to the selected access enable apparatus.

At the selected access enable apparatus, the process of step S550 is carried out.

At step S550, control unit 110 determines whether a license supervision execution instruction has been received or not. When YES at step S550, control proceeds to step S551, otherwise (NO at step S550), the process of step S550 is repeated.

At step S551, control unit 110 determines whether the selected access enable apparatus meets a predetermined condition and license supervision is allowed or not, likewise step S151 set forth above. When YES at step S551, control proceeds to step S552, otherwise (NO at step S551), control proceeds to step S554.

At step S552, a process similar to that of step S152 set forth above is carried out. Therefore, details thereof will not be repeated. Then, control proceeds to step S553.

At step S553, control unit 110 turns on the supervision flag provided in data temporary storage unit 120. Then, the process carried out at the selected access enable apparatus ends. In this case, the selected access enable apparatus becomes the supervision apparatus.

At step S554, control unit 110 transmits license supervision disapproval data to the supervision apparatus, likewise step S154 set forth above. Then, the process carried out at the selected access enable apparatus ends.

At the supervision apparatus, control proceeds to step S544, following the process of step S543.

At step S544, a process similar to that of step S144 set forth above is carried out. Therefore, details thereof will not be repeated. When YES at step S544, the power off occasion process B ends. Control returns to the process of FIG. 21 to proceed to step S540A, subsequent to step S540. When NO at step S544, control proceeds to step S545.

At step S545, a process similar to that of step S145 set forth above is carried out. Therefore, details thereof will not be repeated. When YES at step S545, the process of step S541 is carried out, otherwise (NO at step S545), the process of step S545 is carried out again.

Referring to FIG. 21 again, control proceeds to step S540A, following the process of step S540.

At step S540A, control unit 110 turns off the power of the supervision apparatus. Thus, the process of the supervision apparatus ends.

At the access enable apparatus, control proceeds to step S532, following the process of step S531B.

At step S532, determination is made whether a power off instruction has been issued or not. Details thereof are similar to those of step S124 set forth above. Therefore, detailed description thereof will not be repeated. When YES at step S532, control proceeds to step S534, otherwise (NO at step S532), the process of step S530 is carried out again.

At step S534, control unit 110 turns off the power of the access enable apparatus. Thus, the process at the access enable apparatus ends.

The present embodiment is applicable to the case where the supervision apparatus supervises supervisory information set forth above.

The process of supervising supervisory information by the supervision apparatus (hereinafter also referred to as supervisory process C3) will be described hereinafter. It is assumed that supervisory information is prestored in storage unit 140 of each MFP connected on network 210.

Figure 23:
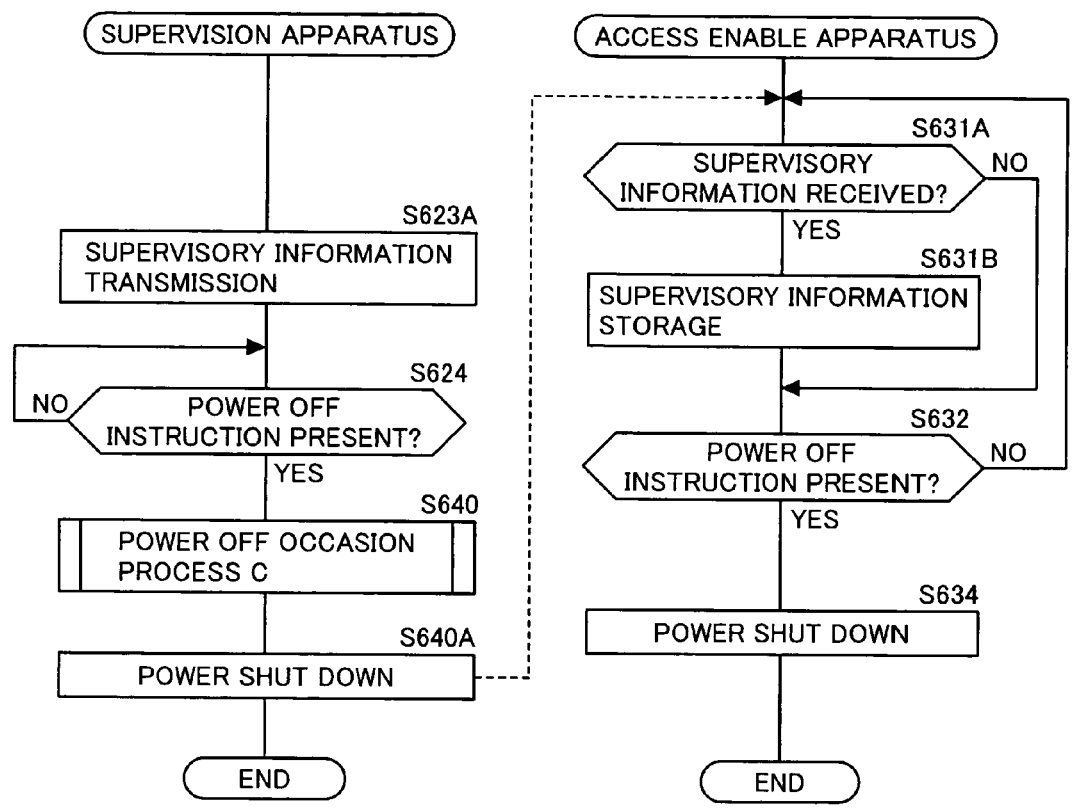
FIG. 23 is a flow chart of a supervisory process C3.

Referring to the flow chart of FIG. 23, the process of step S623A is carried out at the supervision apparatus.

At step S623A, control unit 110 transmits supervisory information stored in storage unit 140 to all access enable apparatuses.

At the access enable apparatus, the process of step S631A is carried out.

At step S631A, control unit 110 determines whether supervisory information has been received or not. When YES at step S631A, control proceeds to step S631B, otherwise (NO at step S631A), control proceeds to step S632.

At step S631B, control unit 110 stores the received supervisory information in storage unit 140. When supervisory information is already stored in storage unit 140, the received supervisory information is stored in an overwriting manner.

At the supervision apparatus, control proceeds to step S624, following the process of step S623A.

At step S624, a process similar to that of step S124 set forth above is carried out. Therefore, details thereof will not be repeated. When YES at step S624, control proceeds to step S640, otherwise (NO at step SS624), the process of step S624 is carried out.

At step S640, the power off occasion process C is carried out.

Figure 24:
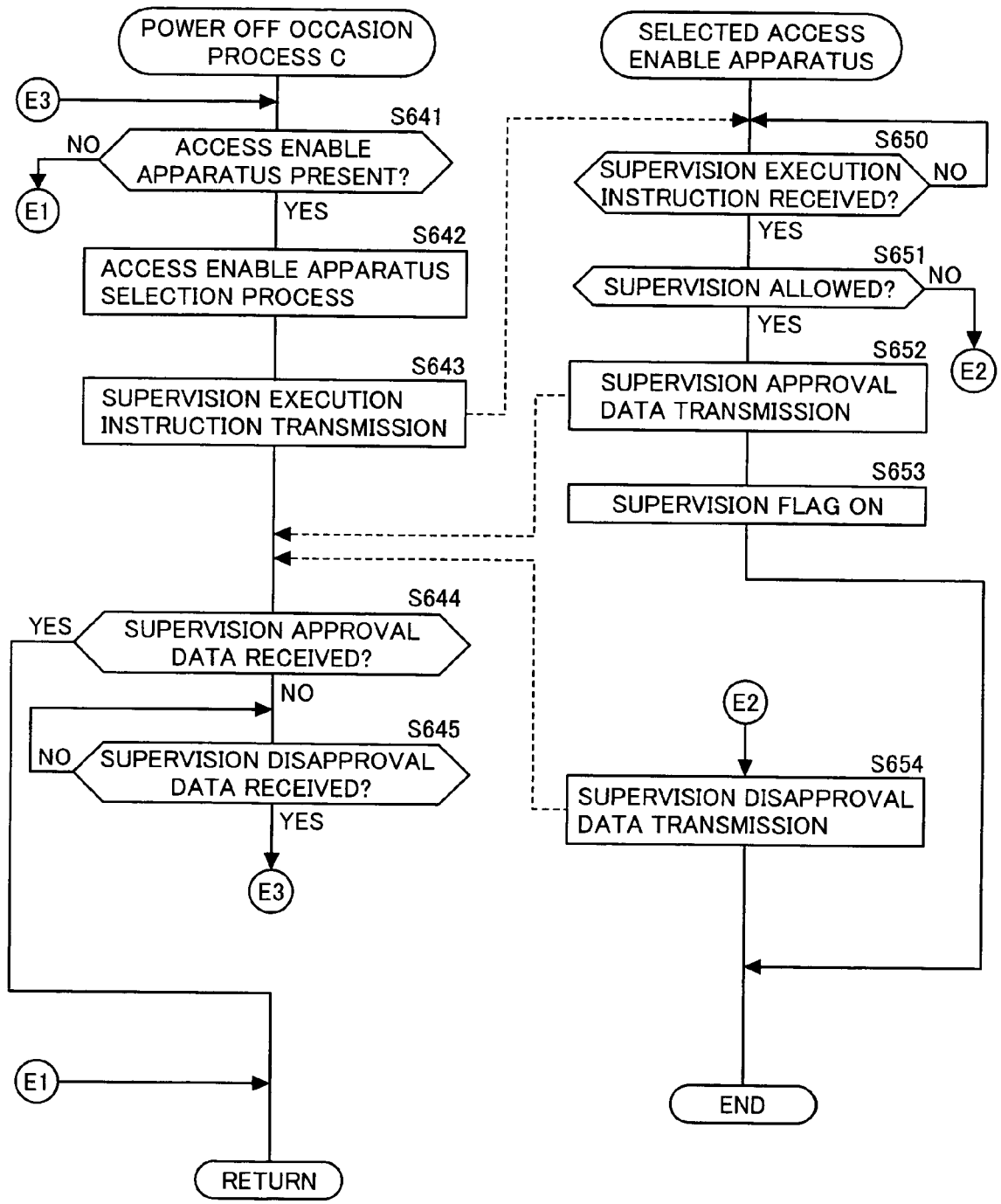
FIG. 24 is a flow chart of a power off occasion process C.

This process is carried out by the supervision apparatus. Referring to the flow chart of FIG. 24, a process similar to that of step S141 set forth above is carried out at step S641. Therefore, details thereof will not be repeated. When YES at step S641, control proceeds to step S642, otherwise (NO at step S641), the power off occasion process C ends. Control returns to the process of FIG. 23 to proceed to step S640A, subsequent to step S640.

At step S642, an access enable apparatus selection process similar to that of step S142 set forth above is carried out to determine a selected access enable apparatus. Then, control proceeds to step S643.

At step S643, control unit 110 transmits a supervision execution instruction to execute supervision of supervisory information to the selected access enable apparatus.

At the selected access enable apparatus, the process of step S650 is carried out.

At step S650, control unit 110 determines whether a supervision execution instruction has been received or not. When YES at step S650, control proceeds to step S651, otherwise (NO at step S650), the process of step S650 is repeated.

At step S651, control unit 110 determines whether the selected access enable apparatus meets the predetermined condition set forth above and supervision of supervisory information is allowed or not, likewise step S251 set forth above. When YES at step S651, control proceeds to step S652, otherwise (NO at step S651), control proceeds to step S654.

At step S652, control unit 110 transmits supervision approval data to the supervisor apparatus, likewise step S252 set forth above. Then, control proceeds to step S653.

At step S653, control unit 110 turns on the supervision flag provided in data temporary storage unit 120. Then, the process carried out at the selected access enable apparatus ends. In this case, the selected access enable apparatus becomes a supervision apparatus.

At step S654, control unit 110 transmits supervision disapproval data to the supervision apparatus, likewise step 254 set forth above. Then, the process at the selected access enable apparatus ends.

At the supervision apparatus, control proceeds to step S644, following the process of step S643.

At step S644, a process similar to that of step S244 set forth above is carried out. Therefore, details thereof will not be repeated. When YES at step S644, the power off occasion process C ends. Control returns to the process of FIG. 23 to proceed to step S640A, subsequent to step S640. When NO at step S644, control proceeds to step S645.

At step S645, a process similar to that of step S245 set forth above is carried out. Therefore, details thereof will not be repeated. When YES at step S645, the process of step S641 is carried out again, otherwise (NO at step S645), the process of step S645 is carried out again.

Referring again to FIG. 23, following the process of step S640, control proceeds to step S640A.

At step S640A, control unit 110 turns off the power of the supervision apparatus. Thus, the process at the supervision apparatus ends.

At the access enable apparatus, control proceeds to step S632, following the process of step S631B.

At step S632, determination is made whether a power off instruction has been issued or not. Details thereof will not be repeated since it is similar to that of step S124. When YES at step S632, control proceeds to step S634, otherwise (NO at step S632), the process of step S631A is carried out again.

At step S634, control unit 110 turns off the power of the access enable apparatus. Thus, the process at the access enable process apparatus ends.

Since supervisory information is shared by a plurality of MFPs in the present embodiment, supervision of supervisory information, even when the power of the supervision apparatus is turned off suddenly due to failure or the like, can be carried out by another MFP. Such a process (hereinafter, referred to as function usage process A) will be described hereinafter.

Figure 25:
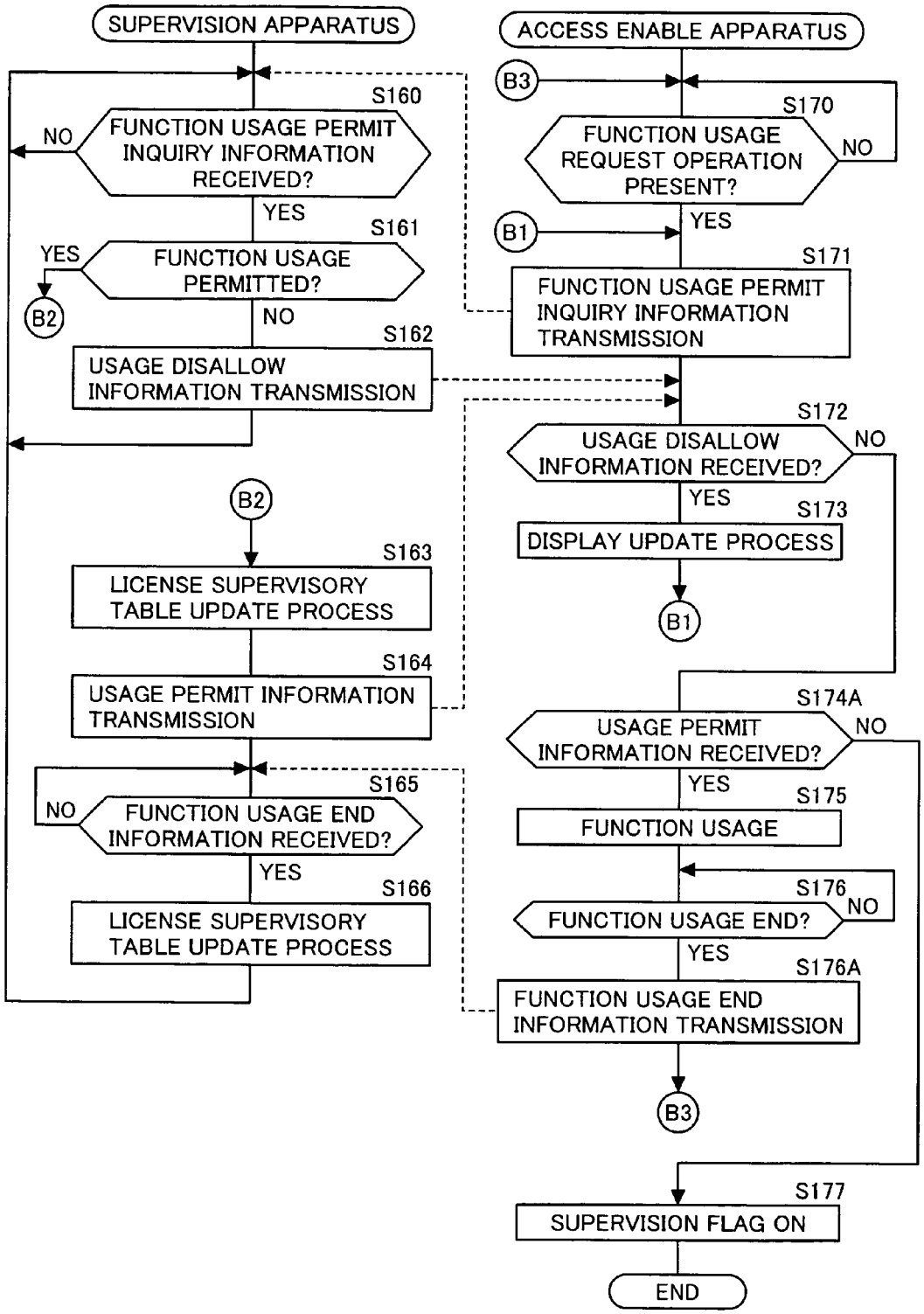
FIG. 25 is a flow chart of a function usage process A.

Referring to the flow chart of FIG. 25, function usage process A differs from the function usage process of FIG. 11 in that step S174A is carried out instead of step S174, and an additional process of an addition step S177 is carried out. The remaining elements are similar to those of the function usage process of FIG. 11. Therefore, details thereof will not be repeated. Only different elements in the process will be described hereinafter.

At step S174A, control unit 110 determines whether usage enable information has been received or not. When YES at step S174, control proceeds to step S175, otherwise (NO at step S174), control proceeds to step S177. Proceeding to step S177 means that there is no response from the supervision apparatus.

One cause thereof may be the power of the supervision apparatus being turned off suddenly by failure or the like.

Another cause may be the power of the supervision apparatus suddenly turned off by the plug being pulled up out erroneously.

At step S177, control unit 110 turns on the supervision flag provided in data temporary storage 120. Then, the process carried out at the access enable apparatus ends. In this case, the access enable apparatus becomes the supervision apparatus that uses the license supervisory information stored in storage unit 140.

Figure 26:
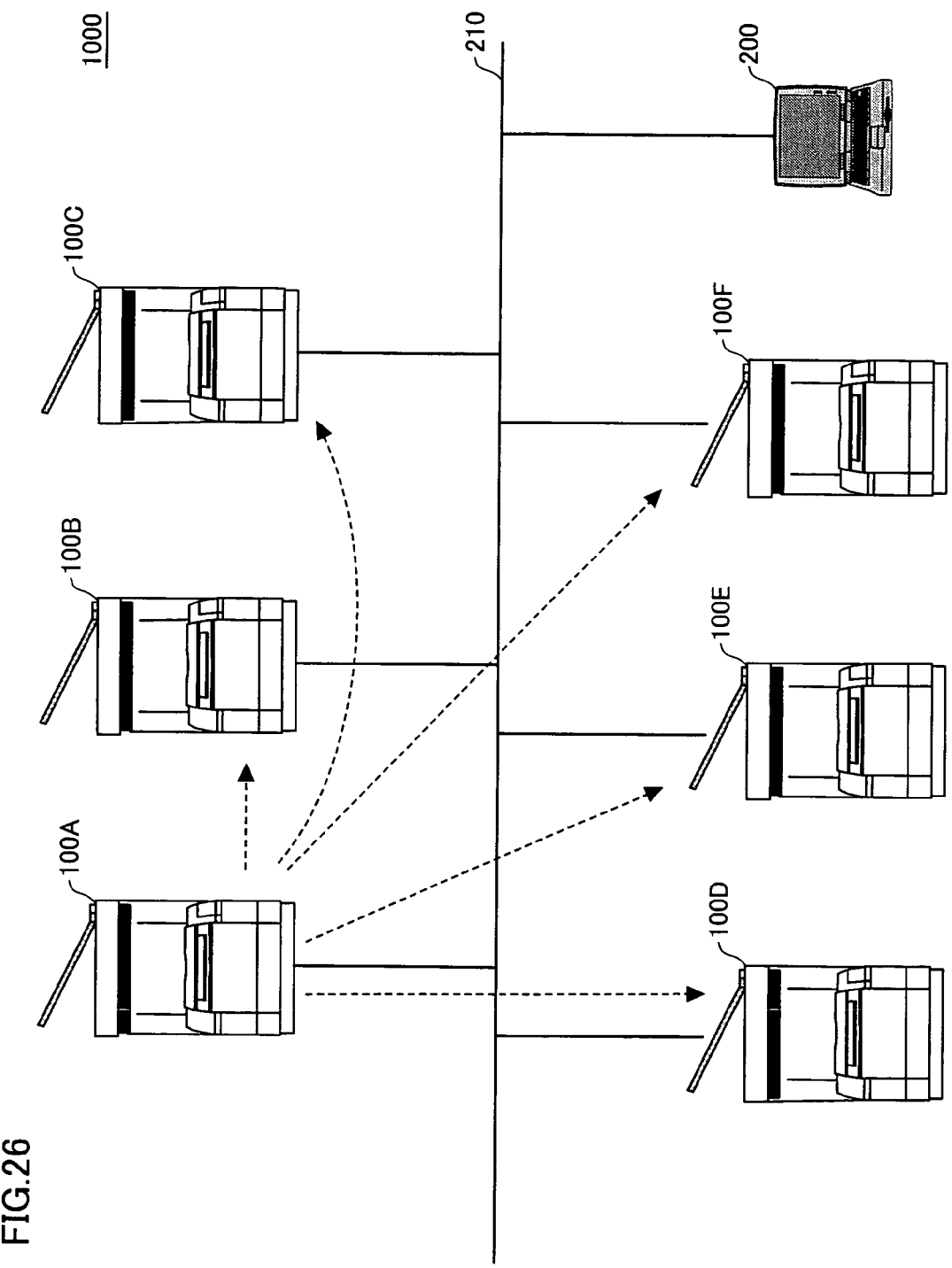
FIG. 26 represents transmission of supervisory information by a supervision apparatus to a plurality of access enable apparatuses on the network.

FIG. 26 represents the transmission of supervisory information to a plurality of access enable apparatuses on network 210 by the supervision apparatus. In this case, it is assumed that MFP 100A is the supervision apparatus, and MFPs 100B, 100C, 100D, 100E and 100F are access enable apparatuses.

Referring to FIG. 26, the supervision apparatus transmits supervisory information to a plurality of access enable apparatuses at a predetermined time interval by the process set forth above.

By sharing the supervisory information among a plurality of MFPs in accordance with the process set forth above, another access enable apparatus issuing a function usage request can operate as the supervision apparatus even when the power of the current supervision apparatus is suddenly turned off. Therefore, there is provided the advantage of ensuring proper operation of an access enable apparatus that requires supervisory information by the supervision apparatus.

Fourth Embodiment

In the previous third embodiment, another access enable apparatus that issues a function usage request can function as the supervision apparatus by sharing supervisory information among a plurality of MFPs even when the power of the current supervision apparatus is suddenly turned off.

The present fourth embodiment is directed to a process of allowing another access enable apparatus to function as the supervision apparatus in the event of the power of the current supervision apparatus being turned off suddenly even when supervisory information is not shared among a plurality of MFPs.

Specifically, the access enable apparatus that has issued a function usage request becomes the supervision apparatus in accordance with the process of FIG. 25 set forth above.

Then, the supervision apparatus obtains license information from another access enable apparatus by the process of FIG. 5 to generate license supervisory information.

By such a process, another access enable apparatus can function as the supervision apparatus in the event of the power of the current supervision apparatus being turned off suddenly even when supervisory information is not shared among a plurality of MFPs.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a network that allows a plurality of apparatuses to be connected, an image formation apparatus connected to said network and capable of operating in a supervisory mode directed to supervising supervision information, that includes at least license information, of each of said plurality of apparatuses, said image formation apparatus comprising:
 a storage unit for storing said supervision information of said plurality of apparatuses,
 a supervisory mode setting unit, in a computer processor, to set said supervisory mode of said image formation apparatus,
 a detection unit, in the computer processor, to detect an apparatus, from said plurality of apparatuses, attaining a data access enable state and an apparatus, from said plurality of apparatuses, attaining a data access disable state with respect to said network, and
 an information update unit, in the computer processor, to update said supervision information related to said plurality of apparatuses, stored in said storage unit, based on said apparatuses detected by said detection unit,
 wherein when said image formation apparatus is set at said supervisory mode by said supervisory mode setting unit, said image formation apparatus remains in said supervisory mode independent of changes in data access states of other apparatuses of said plurality of apparatuses in the network and until said image formation apparatus receives instruction to change its operational state, and
 wherein when said image formation apparatus is set at supervisory mode and receives an instruction to change its operational state, said image formation apparatus selects another apparatus from said plurality of apparatuses to operate in said supervisory mode based on at least (i) a number of licenses of functions that each of said plurality of apparatuses has on said network, which is identified in said license information included in said supervision information stored in said storage unit, and (ii) a percentage of a total operating capacity of a computer processor of another apparatus being below a predetermined percentage value.

2. The image formation apparatus of claim 1, wherein said instruction is a power off instruction initiated by a user.

3. The image formation apparatus according to claim 1, further comprising a supervision feasible apparatus detection unit, in the computer processor, to detect a supervision feasible apparatus capable of operating in supervisory mode,
 wherein said supervisory mode setting unit sets said image formation apparatus at said supervisory mode when a supervision feasible apparatus, which is in a data access enable state with respect to said network, is not detected by said supervision feasible apparatus detection unit.

4. The image formation apparatus according to claim 1, further comprising:
 a supervision feasible apparatus detection unit, in the computer processor, to detect a supervision feasible apparatus capable of operating in supervisory mode, and
 a supervisory information reception unit, in the computer processor, to receive supervision information, wherein
 when said image formation apparatus is not set at supervisory mode, said supervisory information reception unit receives said supervision information from a supervision feasible apparatus set at said supervisory mode detected by said supervision feasible apparatus detection unit at a point of time of attaining a data access enable state with respect to said network, and
 when said image formation apparatus is selected to operate in said supervisory mode, said supervisory mode setting unit sets said image formation apparatus at a supervisory mode.

5. The image formation apparatus according to claim 1, further comprising:
 a supervision feasible apparatus detection unit, in the computer processor, to detect at least one supervision feasible apparatus capable of operating in supervisory mode, and
 a supervisory information transmission unit, in the computer processor, to transmit supervision information,
 wherein when said image formation apparatus is set at supervisory mode, said supervisory information transmission unit transmits said supervision information to the at least one of said supervision feasible apparatuses in a data access enable state with respect to said network detected by said supervision feasible apparatuses detection unit.

6. The image formation apparatus according to claim 5, wherein said supervisory information transmission unit transmits said supervision information to said at least one supervision feasible apparatus at a predetermined time interval.

7. The image formation apparatus according to claim 1, further comprising a supervisory information transmission unit, in the computer processor, to transmit said supervision information,
 wherein when said image formation apparatus is set at supervisory mode, said supervisory information transmission unit transmits said supervision information to one of said at least one supervision feasible apparatus prior to attaining a data access disable state with respect to said network.

8. The image formation apparatus according to claim 1, wherein said storage unit stores said supervision information prior to said image formation apparatus attaining a data access disable state with respect to said network.

9. The image formation apparatus according to claim 1, wherein said supervision information further includes at least one of account information, address information, and access right information.

10. A network system including a plurality of image formation apparatuses connected to a network on which a plurality of apparatuses are connected,
wherein a first image formation apparatus among said plurality of image formation apparatuses is capable of operating in a supervisory mode directed to supervising supervision information, that includes at least license information, of each of said plurality of apparatuses, and comprises:
a storage unit for storing said supervision information of said plurality of apparatuses,
a first supervisory mode setting unit, in a computer processor, configured to set said first image formation apparatus at said supervisory mode, wherein
(i) when said first image formation apparatus is set at supervisory mode by said first supervisory mode setting unit, said first image formation apparatus remains in said supervisory mode independent of changes in operational state of other apparatuses of said plurality of apparatuses in the network and until said first image formation apparatus receives instruction to change its operational state, and
(ii) when said first image formation apparatus is set at supervisory mode and receives an instruction to change its operation state, said image formation apparatus selects a second image formation apparatus from said plurality of apparatuses to operate in said supervisory mode based on at least (i) a number of licenses of functions that each of said plurality of apparatuses has on said network, which is identified in said license information included in said supervision information stored in said storage unit, and (ii) a percentage of a total operating capacity of a computer processor of the second image formation apparatus being below a predetermined percentage value; and
a supervision information transmission unit, in the computer processor, configured to transmit said supervision information related to said plurality of apparatuses to said selected second image formation apparatus in response to a change in said operational state of said first image formation apparatus,
wherein said selected second image formation apparatus is capable of operating in a supervisory mode directed to supervising supervision information, that includes at least license information, of each of said plurality of apparatuses and comprises:
a second storage unit for storing said supervision information of said plurality of apparatuses,
a second supervisory mode setting unit to set said second image formation apparatus at said supervisory mode,
a supervision information reception unit receiving said supervision information from said first information apparatus, and
a supervision information update unit to update said supervision information related to said plurality of apparatuses, stored in said second storage unit, based on said supervision information received from said first information apparatus, wherein
when said supervision information transmitted by said supervisory information transmission unit of said first image formation apparatus is received by said supervisory information reception unit of said second image formation apparatus, said second supervisory mode setting unit of said second image formation apparatus sets said second image formation apparatus at said supervisory mode, and said supervisory information update unit of said second image formation apparatus updates said supervision information to supervise said supervision information related to said plurality of apparatuses based on said received supervision information.

11. In a network that allows a plurality of apparatuses to be connected, a non-transitory computer-readable medium having stored thereon a program product that causes an image formation apparatus that is connected to said network and capable of operating in a supervisory mode directed to supervising supervision information, that includes at least license information, of each of said plurality of apparatuses to execute the steps of:
setting, by a supervisory mode setting unit in a computer processor of said image formation apparatus, said image formation apparatus at said supervisory mode and maintaining said image formation apparatus in said supervisory mode until said image formation apparatus receives an instruction to change its operational state;
detecting an apparatus, from said plurality of apparatuses, attaining a data access enable state and an apparatus, from said plurality of apparatuses, attaining a data access disable state with respect to said network;
updating said supervision information of said plurality of apparatus based on information related to the apparatuses detected by said detecting step; and
selecting, when said image formation apparatus receives an instruction to change its operational state, another apparatus from said plurality of apparatuses to operate in said supervisory mode based on at least (i) a number of licenses of functions that each of said plurality of apparatuses has on said network, which is identified in said license information included in said supervision information of each of the other apparatuses from the plurality of apparatuses, and (ii) a percentage of a total operating capacity of a computer processor of another apparatus being below a predetermined percentage value.

12. The computer-readable medium according to claim 11, causing an image formation apparatus to further execute the steps of:
detecting at least one supervision feasible apparatus, and
setting said image formation apparatus at said supervisory mode when said at least one supervision feasible apparatus in a data access enable state with respect to said network is not detected at said step of detecting said supervision feasible apparatus at a point of time of attaining a data access enable state with respect to said network.

13. The computer-readable medium according to claim 11, causing an image formation apparatus to further execute the steps of:
prior to being set at supervisory mode, detecting at least one supervision feasible apparatus, and
receiving said supervision information from a supervision feasible apparatus set at said supervisory mode detected at said step of detecting said at least one supervision feasible apparatus at a point of time of attaining a data access enable state with respect to said network, wherein said image formation apparatus is set at said supervisory mode after receiving said supervision information.

14. The computer-readable medium according to claim 11, causing an image formation apparatus to further execute the steps of:
detecting at least one supervision feasible apparatus, and
when said image formation apparatus is set at supervisory mode, transmitting said supervision information relating to said plurality of apparatuses to said at least one supervision feasible apparatus in a data access enable state with respect to said network detected at said step of detecting said at least one supervision feasible apparatus.

15. The computer-readable medium according to claim 14, wherein said step of transmitting includes the step of transmitting said supervision information related to said plurality of apparatuses to said at least one supervision feasible apparatus at a predetermined time interval.

16. The computer-readable medium according to claim 11, wherein when said image formation apparatus is set at supervisory mode, causing said image formation apparatus to execute the steps of (i) selecting another image formation apparatus from said at least one supervision feasible apparatus and (ii) transmitting said supervision information related to said plurality of apparatuses to said selected apparatus prior to attaining a data access disable state with respect to said network.

17. The computer-readable medium according to claim 11, causing said image formation apparatus to further execute the step of storing said supervision information related to said plurality of apparatuses at a storage unit of said image formation apparatus prior to attaining a data access disable state with respect to said network.

18. The computer-readable medium according to claim 11, wherein said supervision information further includes at least one of account information, address information, and access right information.

\* \* \* \* \*